United States Patent
Wada et al.

(10) Patent No.: US 6,758,176 B2
(45) Date of Patent: Jul. 6, 2004

(54) VALVE TIMING CONTROL APPARATUS FOR INTERNAL COMBUSTION ENGINE

(75) Inventors: Koji Wada, Tokyo (JP); Tatsuhiko Takahashi, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/281,324

(22) Filed: Oct. 28, 2002

(65) Prior Publication Data

US 2003/0196622 A1 Oct. 23, 2003

(30) Foreign Application Priority Data

Apr. 23, 2002 (JP) ........................................ 2002-120861

(51) Int. Cl.[7] .............................................. F01L 1/34
(52) U.S. Cl. ............................. 123/90.15; 123/90.17; 123/90.27
(58) Field of Search ........................ 123/90.15, 90.16, 123/90.17, 90.27, 90.31

(56) References Cited

U.S. PATENT DOCUMENTS

| | | | | |
|---|---|---|---|---|
| 6,006,708 A | * | 12/1999 | Ken et al. .................. | 123/90.17 |
| 6,330,870 B1 | * | 12/2001 | Inoue et al. ............... | 123/90.17 |
| 6,494,173 B2 | * | 12/2002 | Takahashi et al. ......... | 123/90.15 |
| 6,499,450 B2 | * | 12/2002 | Takahashi et al. ......... | 123/90.15 |
| 6,505,586 B1 | * | 1/2003 | Sato et al. ................. | 123/90.17 |
| 6,526,930 B2 | * | 3/2003 | Takahashi et al. ......... | 123/90.17 |

FOREIGN PATENT DOCUMENTS

JP 2002-256826 9/2002

OTHER PUBLICATIONS

Takahashi et al., Valve Timing Control Apparatus for Internal Combustion Engine, US patent application Publication, Pub. No. US 2003/0200944 A1, Oct. 30, 2003.*

* cited by examiner

Primary Examiner—Thomas Denion
Assistant Examiner—Ching Chang
(74) Attorney, Agent, or Firm—Sughrue Mion, PLLC

(57) ABSTRACT

Valve timing control apparatus for engine includes a cam phase actuator (1113) composed of a first rotor (1) rotatable with a crank shaft, a second rotor (6) mounted on a cam shaft (7) and a lock mechanism (15, 16, 18) for locking the second rotor to the first rotor, a pump (1118) for generating a hydraulic pressure, an ECU for computing a current value corresponding to a pressure for clearing a locked state at the first relative angle for shifting the first relative angle to a second angle, and an OCV (1114) for supplying a pressure for regulating a cam phase of the second rotor in dependence on the current value. The ECU computes a first current value for generating a first pressure for releasing the locked state. The first current value is supplied to the OCV for a predetermined time before shifting the first relative angle.

8 Claims, 22 Drawing Sheets

VALVE TIMING CONTROL APPARATUS FOR INTERNAL COMBUSTION ENGINE

BACKGROUND OF THE INVENTION

1. Field of the Invention

The present invention relates generally to a valve timing control apparatus for controlling valve open/close timing (hereinafter referred to simply as the valve timing) at which an intake valve or an exhaust valve of an internal combustion engine is opened and/or closed in dependence on operating state or condition of the engine.

2. Description of Related Art

In the technical field of the internal combustion engine, there have heretofore been proposed various apparatuses which make it possible to controllably change the valve timing for the intake valve or the exhaust valve of the internal combustion engine (hereinafter also referred to simply as the engine) in dependence on the operation states thereof. For having better understanding of the invention, background techniques will first be described in some detail by reference to FIG. 18 of the accompanying drawings which shows generally and schematically a structure of an internal combustion engine equipped with a conventional valve control apparatus.

Referring to FIG. 18, reference numeral 1101 denotes generally an internal combustion engine which includes an intake pipe 1104 equipped with an air cleaner 1102 for purifying the air sucked into the engine 1101, an air-flow sensor 1103 for measuring intake air quantity (flow rate of the intake air), a throttle valve 1105 for adjusting or regulating the intake air quantity to thereby control the output torque of the engine 1101 and a fuel injector 1106 for injecting an amount of fuel compatible with the intake air quantity.

Further, the internal combustion engine 1101 is provided with a spark plug 1111 for generating sparks for firing air-fuel mixture charged in a combustion chamber of the engine 1101, an ignition coil 1110 for supplying a high-voltage energy to the spark plug 1111, an exhaust pipe 1107 for discharging an exhaust gas resulting from combustion of the air-fuel mixture, an $O_2$-sensor 1108 for detecting a residual amount of oxygen contained in the exhaust gas, and a three way catalytic converter 1109 capable of purifying concurrently harmful gas components contained in the exhaust gas such as THC, CO and $NO_x$.

A sensor plate 1116 having a tooth or projection (not shown) formed at a predetermined position is mounted on a crank shaft for corotation therewith for detecting the crank angle (angular position of the crank shaft) in cooperation with a crank angle sensor 1115 which is so designed as to generate a signal upon every passing-by of the projection (not shown) of the sensor plate 1116.

Further provided are a cam phase actuator 1113 for changing a relative angle of a cam shaft relative to the crank shaft and a cam angle sensor 1112 for generating a pulse signal upon passing-by of a projection of a cam angle detecting sensor plate (not shown) to thereby detect the cam angle in a similar manner as the crank angle sensor 14 described above.

Provided in association with the cam phase actuator 1113 are an oil control valve (hydraulic pressure regulating means) 1114 for regulating the hydraulic pressure applied to the cam phase actuator 1113 to thereby control the relative angle (cam phase) of the cam shaft relative to the crank shaft and an ECU (electronic control unit serving as arithmetic means as well) 1117 which is in charge of controlling the cam phase in addition to the control of operation of the internal combustion engine 1101 on the whole.

Further provided are an oil pump 1118 for generating a hydraulic pressure to drive the cam phase actuator 1113 while feeding a lubricating oil under pressure to mechanical constituent parts of the internal combustion engine 1101 and a hydraulic pressure sensor 1119 for detecting the hydraulic pressure of the lubricating oil fed under pressure to the oil control valve 1114 from the oil pump 1118.

Additionally, there are provided an oil temperature sensor 1120 for detecting temperature of the oil fed under pressure from the oil pump 1118 to the oil control valve 1114 and a water temperature sensor 1122 for detecting temperature of cooling water 1121 employed for cooling the engine 1101.

As a typical one of the hitherto known valve timing control apparatus (cam phase actuator) 1113 for the internal combustion engine 1101, there can be mentioned the one shown in FIGS. 19 to 23 of the accompanying drawings, in which FIG. 19 is a view showing an internal structure of a conventional vane-type valve timing control apparatus, and FIG. 20 is a vertical sectional view of the same taken along a line A—A shown in FIG. 19.

Further, FIG. 21 is an enlarged perspective view showing a major portion of a lock/unlock mechanism of the conventional vane-type valve timing control apparatus and FIGS. 22 and 23 are vertical sectional views showing the lock/unlock mechanism, respectively.

Next, referring to FIGS. 19 to 23, description will be directed to the conventional valve timing control apparatus 1113.

Referring to the figures, the cam phase actuator (valve timing control apparatus) 1113 includes a first rotor assembly 1 (FIG. 20) which is operatively coupled to the crank shaft (not shown) serving as the output shaft of the engine so that the first rotor assembly 1 rotates in synchronism with the crank shaft.

The first rotor assembly 1 is constituted by a sprocket 2 adapted to rotate together with the crank shaft, a case 3 having a plurality of projecting shoes 3a which project radially inwardly from the inner peripheral portion of the case 3 to thereby define a corresponding number of hydraulic chambers (FIG. 19), and a cover 4 (FIG. 20) for fluid-tightly closing the hydraulic chambers constituted by the projecting shoes 3a of the case 3, wherein the sprocket 2, the case 3 and the cover 4 are secured together by means of clamping members 5 such as bolts or the like (FIGS. 19, 20) in an integral structure.

Disposed within the case 3 rotatably relative to the first rotor assembly 1 is a rotor (second rotor) 6 (FIG. 19) which is integrally secured to the cam shaft 7 by means of a clamping member 8 such as a bolt or the like (FIG. 20). The cam shaft 7 constitutes a part of the mechanism for opening/closing the intake valve or the exhaust valve. The second rotor 6 includes a plurality of vanes 6a each of which serves to partition each of the hydraulic chambers defined by the projecting shoes 3a, respectively, of the case 3 into a valve timing advancing hydraulic chamber 9 and a valve timing retarding hydraulic chamber 10 (FIG. 19).

Further formed internally of the cam shaft 7 are first oil passages (hydraulic chamber feed passages) 11 through which hydraulic pressure is fed/discharged to/from the valve timing advancing hydraulic chambers 9, respectively, and second oil passages (pressure chamber feed passages) 12 through which the hydraulic pressure is fed/discharged to/from the valve timing retarding hydraulic chambers 10, respectively.

Disposed at a tip end portion of each of the projecting shoes 3a of the case 3 and a tip end portion of each of the vanes 6a of the second rotor 6, respectively, are oil sealing means 13 for preventing occurrence of oil leakage between the valve timing advancing hydraulic chamber 9 and the valve timing retarding hydraulic chamber 10 (FIG. 19).

Formed in one of the vanes 6a of the second rotor 6 is a receiving hole 14 for receiving therein a lock pin. More specifically, a lock pin 15 (which may also be referred to as locking member or locking mechanism) which is implemented as a straight pin of a substantially cylindrical shape is disposed within the receiving hole 14 for the purpose of restricting relative rotation between the first rotor assembly 1 and the second rotor 6 (FIG. 20).

In the engine starting phase or state in which no hydraulic pressure is effective internally of the cam phase actuator, the lock pin 15 serves to prevent the second rotor 6 from vibrating in the rotating direction under a reaction force of a cam (not shown) integrally secured to the cam shaft 7 to thereby suppress knocking noise (abnormal noise) which will otherwise be generated through repetitive impacts of the second rotor 6 on the first rotor assembly 1.

To this end, the lock pin 15 is constantly resiliently urged toward the first rotor assembly 1 under the influence of urging means (locking means) 16 such as a coil spring disposed between the rear wall of the receiving hole 14 and the lock pin 15 so that the lock pin 15 can engage in a retaining hole which will be described hereinafter.

Further, a discharging hole (unlock mechanism) 17 is formed in communication with the receiving hole 14 for discharging the back pressure acting on the lock pin 15.

On the other hand, the sprocket 2 which serves as the first rotor is provided with a retaining hole (lock mechanism) 18 at a position where the lock pin 15 can be received in the retaining hole 18 when the second rotor 6 assumes a most retard position relative to the first rotor assembly 1.

A pin releasing or unlocking hydraulic chamber 18a is defined between the inner wall of the retaining hole 18 and an outer wall of the lock pin 15 (FIGS. 22, 23).

The vane 6a having the receiving hole 14 formed therein is provided with a check valve (unlock mechanism) 19 for releasing the lock pin 15 from the state retained or locked in the retaining hole 18 by selecting either the valve timing advancing hydraulic chamber 9 or the valve timing retarding hydraulic chamber 10 in which higher pressure prevails, to thereby allow the pressure within the selected chamber to be fed into the retaining hole 18 in which the lock pin 15 is retained or locked (FIGS. 21, 22, 23).

The check valve 19 is hydraulically communicated to the interior of the retaining hole 18 by way of a first pin unlocking hydraulic pressure feed passage (unlock mechanism) 20 formed in the vane 6a of the second rotor 6 and a second pin unlocking hydraulic pressure feed passage (unlock mechanism) 21 formed in the sprocket 2 (FIG. 22).

Further, the check valve 19 and the valve timing advancing hydraulic chamber 9 are communicated with each other by way of a valve timing advancing hydraulic pressure distribution passage (unlock mechanism) 22. Similarly, the check valve 19 and the valve timing retarding hydraulic chamber 10 are communicated with each other by way of a valve timing retarding hydraulic pressure distribution passage (unlock mechanism) 23 (See FIG. 21).

Furthermore, the valve timing retarding hydraulic chamber 10 is communicated with a back pressure chamber 14a of the receiving hole 14 by way of a purge passage 24 (FIG. 21).

Now, description will turn to operation of the conventional valve timing control apparatus of the structure described above.

The ECU 1117 is so designed or programmed as to arithmetically determine or compute the target or desired phase angle on the basis of the operating state of the engine 1101. Further, the ECU 1117 arithmetically determines a detected phase angle indicative of the valve timing on the basis of the crank angle detected by the crank angle sensor 1115 and the cam angle detected by the cam angle sensor 1112, to thereby arithmetically determine deviation of the detected phase angle from the desired phase angle (i.e., difference or error between the desired phase angle and the detected phase angle).

Further, the ECU 1117 arithmetically determines or computes an energizing current value (conduction current value) or duty ratio for the oil control valve 1114 on the basis of the error between the detected phase angle and the desired phase angle so that the former coincides with the latter.

The oil control valve 1114 selects the oil passage for the cam phase actuator 1113 on the basis of the computed value to thereby control the valve timing by adjusting the hydraulic pressure feeding.

In the engine starting operation of the engine 1101, the oil control valve 1114 is so controlled that the hydraulic medium or oil is supplied or fed to the valve timing retarding hydraulic chambers 10 of the cam phase actuator 1113.

On the other hand, when the operation of the engine 1101 is stopped, there is the possibility that the oil within the cam phase actuator 1113 and the oil passage extending from the oil pump 1118 to the cam phase actuator 1113 may be discharged into an oil pan. In that case, when the engine operation is started, the air or the air containing oil within the oil passage is introduced into the valve timing retarding hydraulic chambers 10 to be discharged exteriorly from the cam phase actuator by way of the purge passage 24, the back pressure chamber 14a and the discharging hole 17.

Once the operation of the engine 1101 has been started, the hydraulic pressure is also introduced into the pin unlocking hydraulic chamber 18a from the valve timing retarding hydraulic pressure distribution passage 23. However, the lock pin 15 is held in the state retained within the retaining hole 18 under the influence of the urging means 16. In this manner, generation of abnormal noise due to rattling of the second rotor 6 with the lock pin 15 being released from the retaining hole 18 in the engine starting phase can positively be suppressed or prevented.

In the engine starting operation, in the course of the hydraulic pressure being fed to the valve timing retarding hydraulic chamber 10 from the oil pump 1118, the air trapped within the valve timing retarding hydraulic chamber 10 is exhausted from the apparatus via the purge passage 24 and the discharging hole 17. When the air has been discharged, the residual hydraulic pressure becomes effective due to the oil supplied to the back pressure chamber 14a to prevent the unlocking by increasing the hydraulic pressure at which the lock pin is released.

When the driver of the motor vehicle equipped with the engine system now under consideration depresses an accelerator pedal in succession to the starting of the engine operation to thereby issue a valve timing advancing command, the ECU 1117 responds thereto by controlling the oil control valve 1114 such that the hydraulic pressure is introduced into the valve timing advancing hydraulic chambers 9.

Then, the oil within the valve timing advancing hydraulic chamber 9 is introduced into the pin unlocking hydraulic chamber 18a by way of the valve timing advancing hydraulic pressure distribution passage 22, as a result of which the hydraulic pressure of the oil introduced into the pin unlocking hydraulic chamber 18a acts on the tip end of the lock pin 15 to push it in the releasing or unlocking direction against only the biasing force of the urging means 16.

Since the oil control valve 1114 is controllably set to the position where the oil is discharged from the valve timing retarding hydraulic chambers 10, the oil contained within the valve timing retarding hydraulic chambers 10 is discharged into the oil pan by way of the oil control valve 1114.

Consequently, the lock pin 15 is pushed outwardly from the retaining hole 18 to be released from the locked state. Now, the second rotor 6 is in the state to operate. More specifically, the second rotor 6 is rotated in the valve timing advancing direction under the hydraulic pressure within the valve timing advancing hydraulic chambers 9, whereby the valve timing advancing control is performed for the engine.

The conventional valve timing control apparatus for the internal combustion engine described above however suffers from a problem that when the desired phase angle changes rapidly from the position at which the lock pin 15 is retained in the retaining hole 18 due to rapid change of the engine operating state which occurs immediately after the operation of the engine 1101 has been started, lowering of the hydraulic pressure brought about by abnormal lowering of the rotation speed or for other reasons, operation of the second rotor 6 is activated early before the lock pin 15 has been disengaged from the retaining hole 18, as a result of which the lock pin 15 is twisted or sticked without being released from the retaining hole 18, making it impossible for the second rotor 6 to operate in the desired direction.

By way of example, in the case where the hydraulic medium or oil passages are so arranged that the lock pin 15 can be released from the locked state only under the hydraulic pressure for advancing the valve timing, when the second rotor 6 is activated rapidly in the valve timing advancing direction in response to the change of the operating state from the state in which the lock pin 15 has been retained in the retaining hole 18 at the most retard position, then the lock pin 15 can not be released from the state locked in the retaining hole 18 but twisted, making it impossible for the second rotor 6 to operate in the valve timing advancing direction, giving rise to a problem.

When the valve timing can not be controlled to the desired phase angle due to the twisting or sticking of the lock pin 15, degradation will naturally occur in respect to the drivability, fuel cost performance and the exhaust gas quality, presenting another problem.

SUMMARY OF THE INVENTION

In the light of the state of the art described above, it is an object of the present invention to provide a valve timing control apparatus for an internal combustion engine in which the problem of the valve timing advancing control failure due to entanglement or sticking (tangling in more general term) of the lock pin as mentioned above can successfully and satisfactorily be solved and thus the drivability, fuel cost performance and the exhaust gas quality of the engine can significantly be improved.

In view of the above and other objects which will become apparent as the description proceeds, there is provided according to a general aspect of the present invention a valve timing control apparatus for an internal combustion engine, which apparatus includes a cam phase actuator composed of a first rotor capable of rotating in synchronism with a crank shaft, a second rotor fixedly mounted on a cam shaft for opening and closing an intake valve or alternatively an exhaust valve, and a lock mechanism for locking the second rotor to the first rotor at a first relative angle. And further includes an oil pump for generating a hydraulic pressure, an arithmetic unit for arithmetically determining a current value corresponding to a hydraulic pressure for releasing a locked state at the first relative angle to thereby shift the first relative angle to a second relative angle, and a hydraulic pressure regulating unit for supplying a hydraulic pressure for regulating a cam phase of the second rotor in dependence on the current value.

In the valve timing control apparatus, the arithmetic unit is so designed as to arithmetically determine a first current value for generating a first hydraulic pressure for releasing the locked state at the first relative angle and supply the first current value to the hydraulic pressure regulating unit for a predetermined time before shifting the first relative angle.

By virtue of the arrangements of the valve timing control apparatus described above, the valve timing can properly be controlled for the desired or target phase angle without being accompanied with tangling of the lock pin because the locked state can positively be cleared or released before the rotation of the rotor is started. Thus, drivability, fuel cost performance and exhaust gas quality of the internal combustion engine can be protected from degradation with much enhanced reliability.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
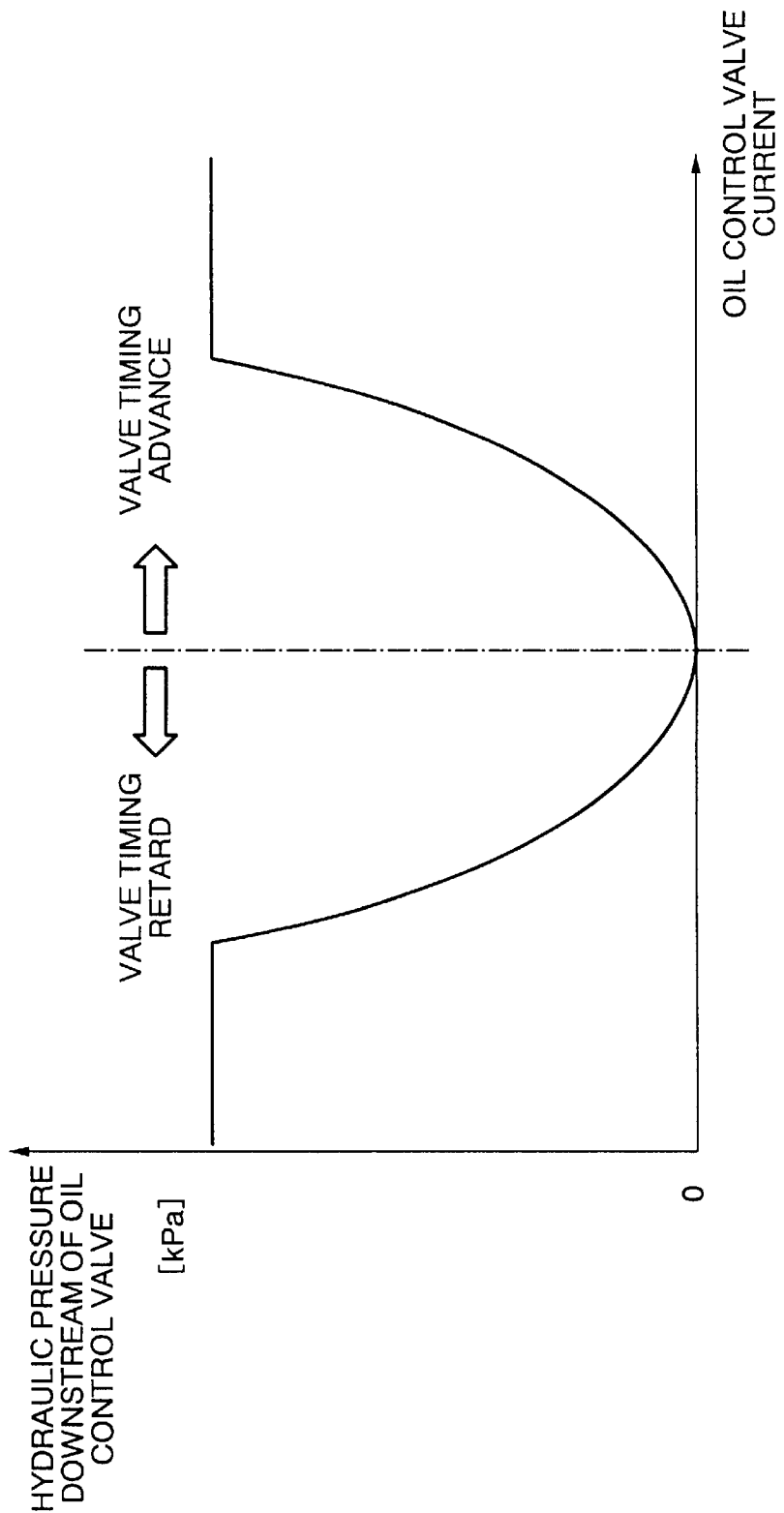
FIG. 1 is a characteristic diagram for graphically illustrating a relation between an electric current supplied to an oil control valve and a hydraulic pressure prevailing downstream of the oil control valve.

The present invention will be described in detail in conjunction with what is presently considered as preferred or typical embodiments thereof by reference to the drawings. In the following description, like reference characters designate like or corresponding parts throughout the several views.

Embodiment 1

Now, the valve timing control apparatus according to a first embodiment of the present invention will be described in detail by reference to the drawings. Incidentally, the mechanical structure of the valve timing control apparatus according to the instant embodiment of the invention is essentially same as that of the conventional apparatus described hereinbefore in conjunction with FIGS. 18 to 23. The valve timing control apparatus now under consideration differs from the conventional one only in several operations performed by the ECU 1117. Accordingly, the following description will primarily be directed to the operations or processings which differ from those of the conventional apparatus. With regard to the other respects, repeated description will be omitted.

In the description which follows, it is presumed that the relative angle (valve timing) of the cam shaft relative to the crank shaft is controlled, that the hydraulic passage arrangement as adopted is such that the lock pin 15 can be released or unlocked from the locked state under the hydraulic pressure which is effective for advancing the valve timing and that the retaining hole 18 for the lock pin 15 is located at the most retard position (i.e., the position at which the valve timing is most retarded).

FIG. 1 is a characteristic diagram for graphically illustrating a relation between the electric current supplied to the oil control valve 1114 (hereinafter this current will also be referred to as the oil control valve current or OCV current in short) and the hydraulic pressure prevailing on the downstream side of the oil control valve.

On the upstream side of the oil control valve 1114, the hydraulic pressure being fed is essentially constant. As can be seen in FIG. 1, when the electric current supplied to the oil control valve 1114 (i.e., OCV current) is of a minimum value, the maximum hydraulic pressure will prevail on the valve timing retard side of the cam phase actuator 1113.

On the other hand, when the OCV current is of a maximum value, a maximum hydraulic pressure will prevail on the valve timing advance side of the cam phase actuator 1113. Incidentally, when the supply current is approximately of an intermediate value between the minimum value and the maximum value, the hydraulic pressure fed to the downstream side of the oil control valve is interrupted.

Thus, the ECU 1117 is so designed or programmed as to change the supply current to the oil control valve 1114 such that the oil control valve 1114 selects either the valve timing advancing oil passage or the valve timing retarding oil passage for the cam phase actuator 1113 disposed downstream of the oil control valve 1114 and regulates the hydraulic pressure supplied to the cam phase actuator 1113.

Next, description will be made of relations between the oil control valve current on one hand and the lock pin releasing hydraulic pressure and the rotor actuating hydraulic pressure in the cam phase actuator 1113 on the other hand.

Figure 2:
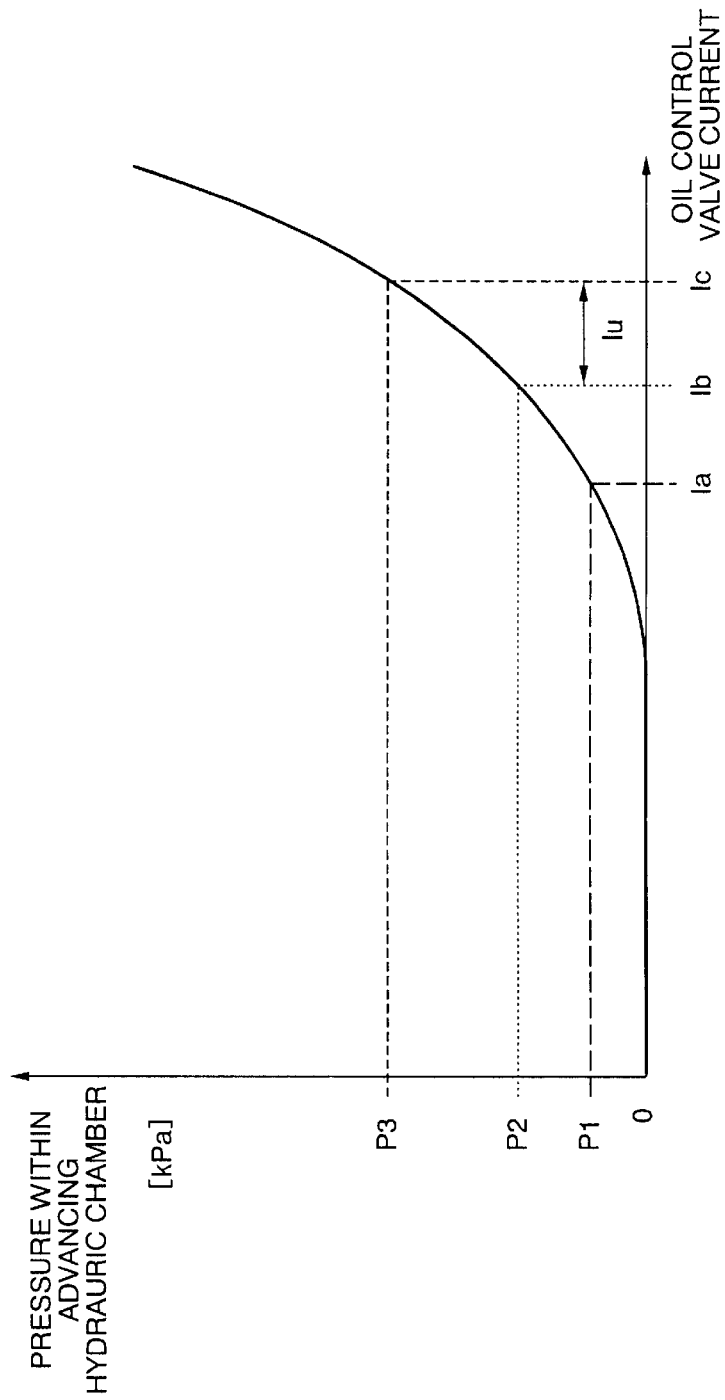
FIG. 2 is a characteristic diagram for graphically illustrating a relation between the oil control valve current and a hydraulic pressure supplied to a valve timing advancing hydraulic chamber.

FIG. 2 is a characteristic diagram for graphically illustrating a relation between the oil control valve current (OCV current) and the hydraulic pressure supplied or fed to the valve timing advancing hydraulic chamber.

In FIG. 2, "P1" indicates a hydraulic pressure level at which the lock pin 15 starts to move in the unlocking direction, and "P2" indicates a hydraulic pressure level at which the lock pin 15 can completely be released. In this conjunction, it is to be noted that both the hydraulic pressures "P1" and "P2" can be set at given appropriate values, respectively, which can be determined in dependence on combination of a pressure receiving area of the lock pin 15 facing the pin unlocking hydraulic chamber 18a and a spring constant of the urging means 16 (see FIG. 23). Further, "P3" indicates a hydraulic pressure level at which the second rotor 6 is actuated.

Figure 22:
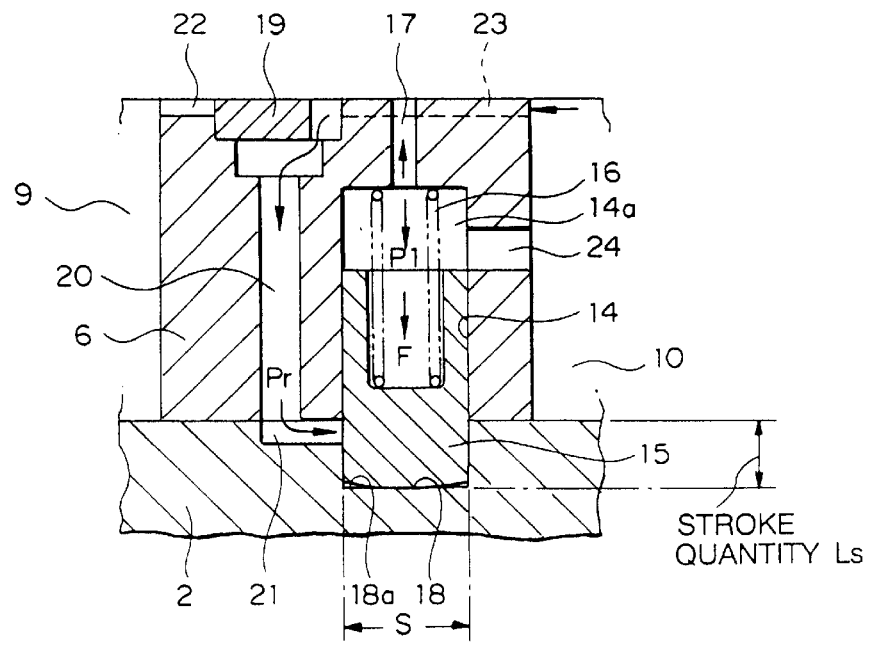
FIG. 22 is a vertical sectional view showing the lock/unlock mechanism.
Figure 23:
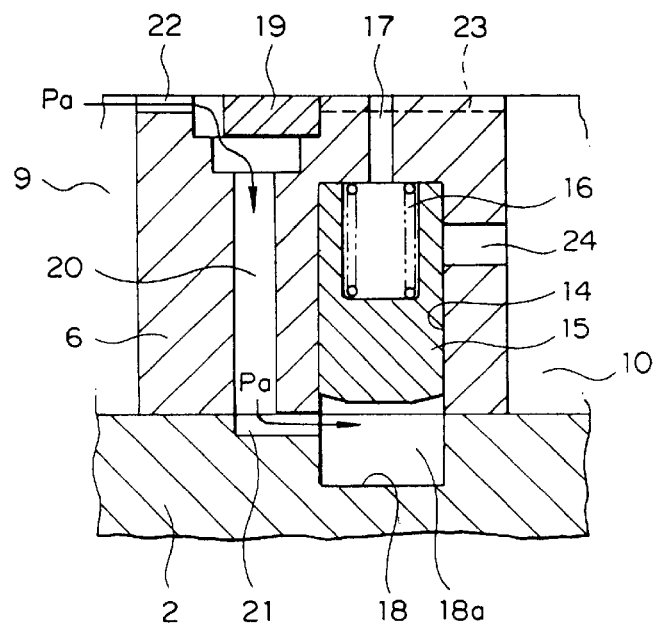
FIG. 23 is a vertical sectional view showing the same.

As described hereinbefore in conjunction with FIGS. 22 and 23, for releasing the lock pin from the locked state, the tip end of the lock pin 15 is pushed in the unlocking or releasing direction against the biasing force of the urging means 16. To this end, the oil control valve 1114 feeds the hydraulic pressure to the oil passage on the valve timing advance side of the cam phase actuator 1113 for thereby releasing the lock pin from the locked state.

During operation of the internal combustion engine 1101, rotation of the cam shaft accompanied with opening/closing of the intake valve. Consequently, such a force or effort will constantly act on the rotor 6 which is effective to rotate the rotor 6 in the valve timing retarding direction relative to the case 3 on an average. This force is referred to as the cam reaction force.

Besides, in general, the oil passage extending from the oil control valve 1114 to the cam phase actuator 1113 is not fluid-tightly sealed but implemented in a piping structure which involves more or less oil leakage in many cases. Such being the circumstances, in order to actuate the rotor 6 in the valve timing advancing direction, the hydraulic pressure therefor has to be corrected so as to compensate for the oil leakage mentioned above.

Thus, in order to hold the rotor 6 at a given or desired position while taking into account the hydraulic pressure for compensating both the cam reaction force and the oil leakage, the supply current value (hold current value) Ic for the oil control valve 1114 is set to a value on the valve timing advance side which is greater than the current value at which the hydraulic pressure downstream of the oil control valve 1114 is interrupted (see FIG. 1).

Additionally, since the pin unlocking hydraulic pressure P2 is set lower than the rotor actuating hydraulic pressure P3 (FIG. 2) so that the lock pin 15 can be unlocked before operation of the rotor 6 is started, the hold current value Ic is set to a value which is greater by a constant "Iu" (mentioned hereinafter) than the supply current value Ib at which the pin unlocking hydraulic pressure P2 can be generated within the valve timing advancing hydraulic chamber 9 of the cam phase actuator 1113 (see FIG. 2).

Figure 3:
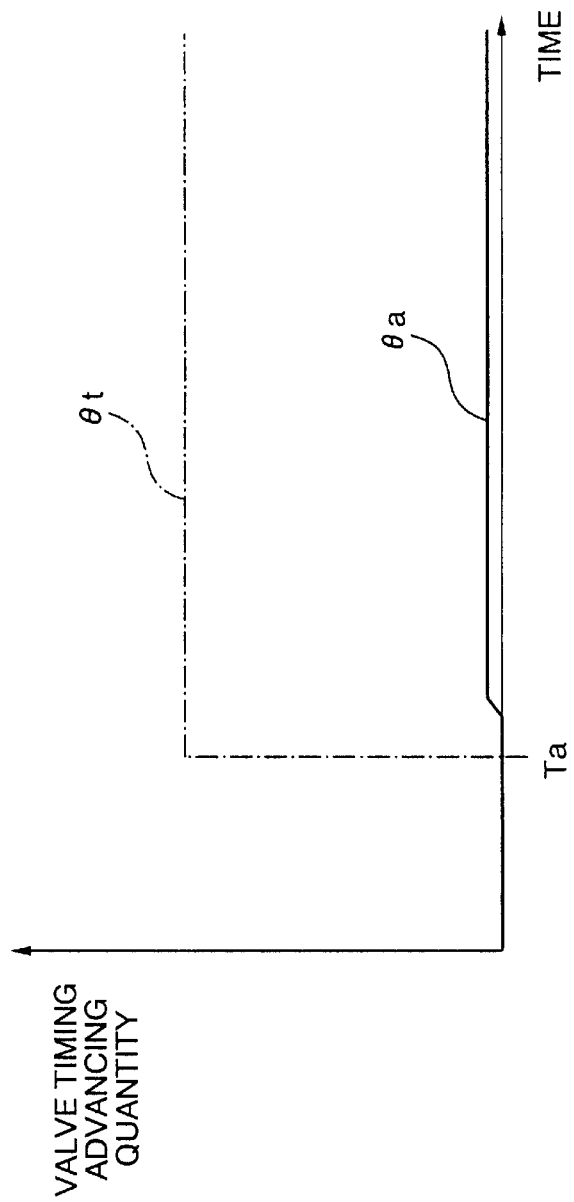
FIG. 3 is a timing chart for graphically illustrating a relation between a desired phase angle and a detected phase angle.
Figure 4:
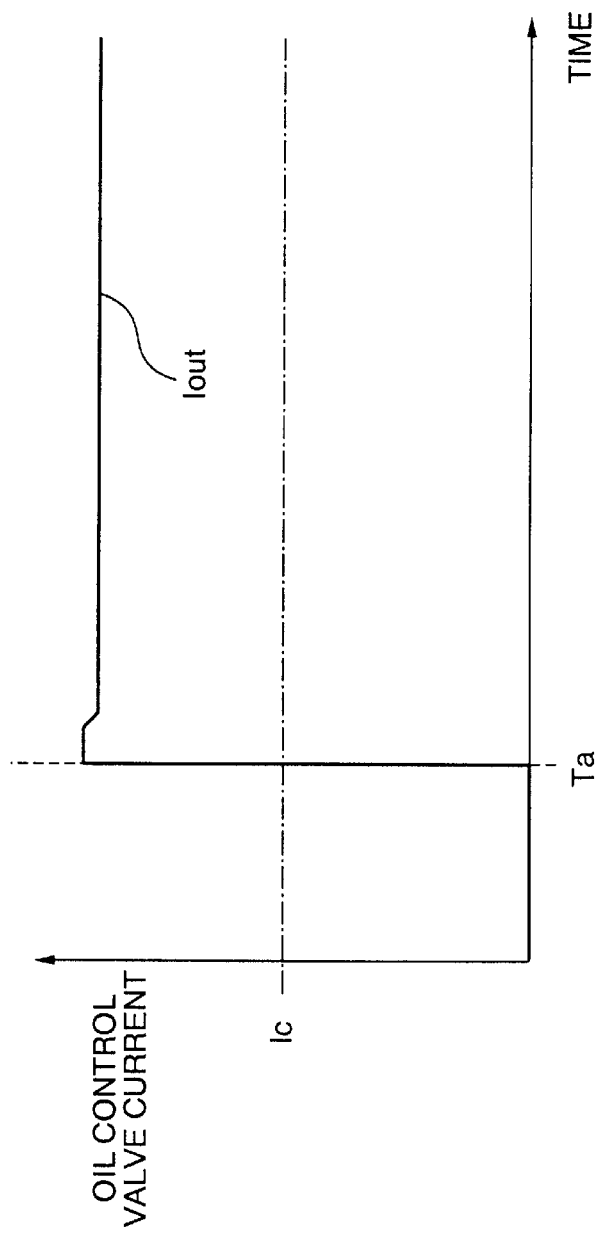
FIG. 4 is a timing chart for graphically illustrating an oil control valve current.

FIGS. 3 and 4 are timing charts for graphically illustrating relations among the desired phase angle θt, the detected phase angle θa and the oil control valve current Iout in the case in which the lock pin 15 gets twisted or sticked or entangled in more general term, preventing the rotor 6 from rotating in the valve timing advancing direction in the conventional phase feedback control (proportional plus integral plus derivative control called PID control in short) of the desired phase angle θt and the detected phase angle θa.

In FIGS. 3 and 4, it is assumed that the desired phase angle θt rapidly changes in the valve timing advancing direction from the most retard position in response to change in the operating state of the engine 1101. As can be seen in FIG. 4, the oil control valve current Iout steeply changes at a time point or timing Ta at which the desired phase angle θt is to be changed.

As described hereinbefore by reference to FIGS. 22 and 23, it is required to move or displace the lock pin 15 by a stroke quantity Ls (see FIG. 22) against the biasing force of the urging means 16 in order to release the lock pin 15 from the locked state.

In the case of the scenario illustrated in FIG. 4, the oil control valve current Iout rapidly changes at the time point or timing Ta in the course of movement of the lock pin 15, involving such situation that the rotor 6 starts to rotate in the valve timing advancing direction under an excessively large hydraulic pressure applied to the valve timing advancing hydraulic chamber 9 of the cam phase actuator 1113 before the lock pin 15 has completely been released from the locked state.

As a result of this, the lock pin 15 gets sticked or entangled in the state where the lock pin 15 is not yet completely released from the retaining hole 18, rendering it impossible for the rotor 6 to rotate in the valve timing advancing direction, which means that the detected phase angle θa can no more approach to the desired phase angle θt (see FIG. 3) and thus the oil control valve current Iout does not converge on the supply current value Ic (see FIG. 4).

Accordingly, in order to evade the unwanted situation mentioned above by allowing the lock pin 15 to be unlocked from the retaining hole 18 without fail, it is necessary to release the lock pin 15 by moving it over the stroke quantity Ls (FIG. 22) in advance before the second rotor 6 starts to rotate in the valve timing advancing direction.

Figure 5:
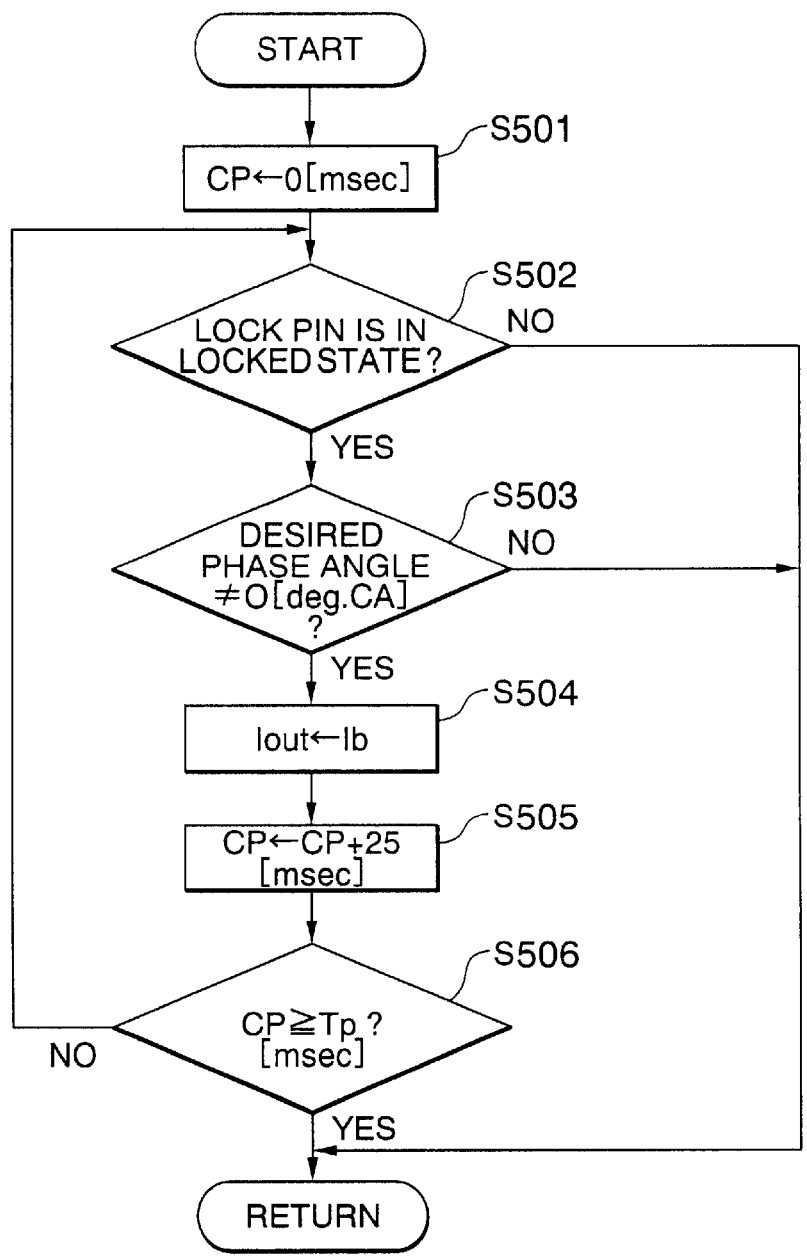
FIG. 5 is a flow chart for illustrating an oil control valve current control procedure for releasing a lock pin in a valve timing control apparatus according to a first embodiment of the present invention.

Next, referring to FIG. 5, description will be made of the operation of the valve timing control apparatus according to the first embodiment of the present invention. FIG. 5 is a flow chart for illustrating an oil control valve current control procedure for releasing the lock pin before the phase feedback control of the cam shaft relative to the crank shaft is executed by the ECU 1117.

Figure 6:
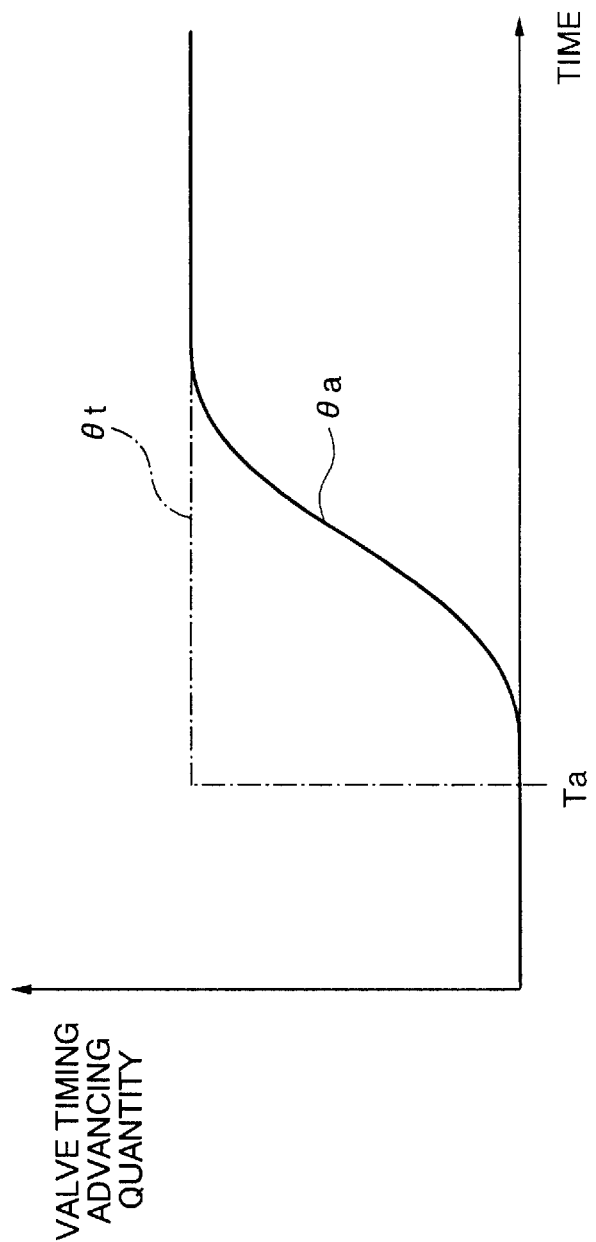
FIG. 6 is a timing chart for graphically illustrating a relation between a desired or target phase angle and a detected phase angle.
Figure 7:
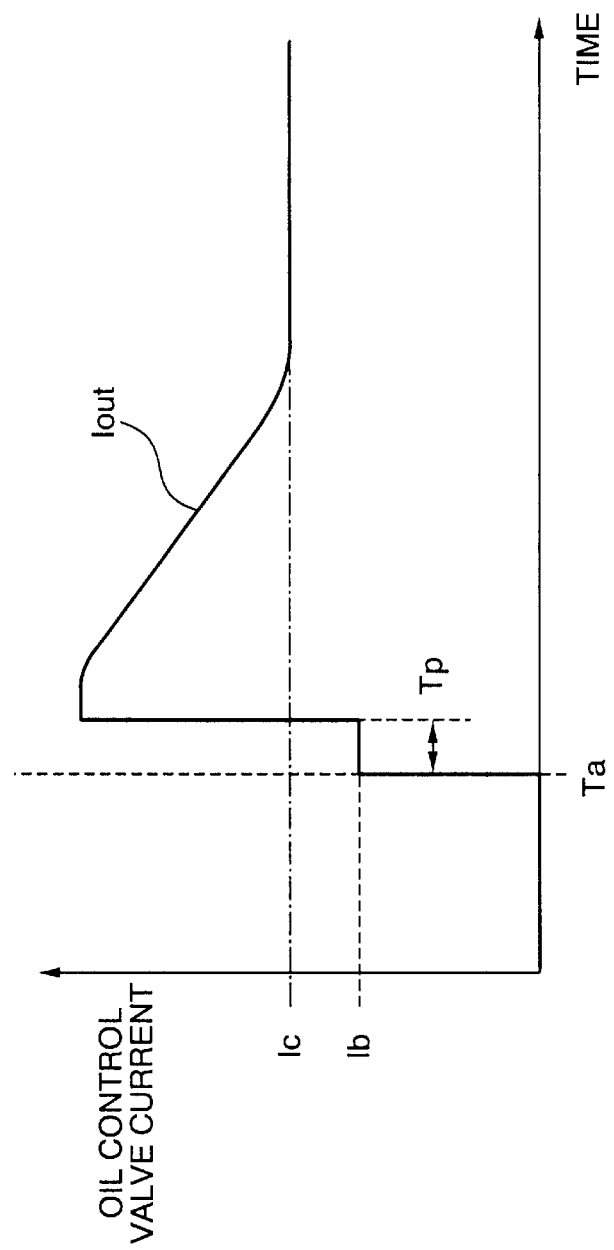
FIG. 7 is a timing chart for graphically illustrating an oil control valve current in the control thereof.

Further, FIGS. 6 and 7 are timing charts for graphically illustrating relations among the desired phase angle θt, the detected phase angle θa and the oil control valve current in the oil control valve current control procedure performed by the valve timing control apparatus according to the instant embodiment of the invention.

Now, referring to FIG. 5, a pin unlocking time counter CP is firstly reset to "0" in a step S501.

In succession, in a step S502, decision is made as to whether or not the lock pin 15 is in the locked state.

When it is determined in the step S502 that the lock pin 15 is in the locked state (i.e., when the decision step S502 results in affirmation "YES"), it is then decided whether or not the desired phase angle θt coincides with the most retard position (i.e., zero [deg. CA]) (step S503). On the other hand, when it is determined in the step S502 that the lock pin 15 is not in the locked state (i.e., when the decision step S502 results in negation "NO"), then the processing routine for the oil control valve current control illustrated in FIG. 5 is terminated by skipping the steps S503 to S506 with transition being then made to the ordinary phase feedback control.

When it is determined in the step S503 that the desired phase angle θt does not represent the most retard position (zero [deg. Ca]), i.e., when the decision step S503 results in "YES", then the oil control valve current value Iout is set to a predetermined current value Ib (see FIG. 7) in a step S504. In this conjunction, the predetermined current value Ib can arithmetically be determined by the ECU 1117 in accordance with the following expression (1):

$$Ib = Ic - Iu \qquad (1)$$

where Ic represents the hold current value which is updated as occasion requires in the course of the ordinary phase feedback control of the desired phase angle θt and the detected phase angle θa to be stored in a memory incorporated in the ECU 1117. Further, in the above expression (1), Iu represents a constant previously determined empirically or experimentally. This constant Iu is also stored in the ECU 1117 in the case of the hold current value Ic.

When it is determined in the step S503 that the desired phase angle θt coincides with the most retard position (zero [deg. CA]), i.e., when the decision step S503 results in "NO", the processing routine of the oil control valve current control illustrated in FIG. 5 is terminated (Return) by skipping the steps S504 to S506 with transition being made to the ordinary phase feedback control.

In a step S504, the oil control valve current value Iout is set. In succession, the pin unlocking time counter CP is incremented by the time taken for one processing period (e.g. 25 [msec]) in a step S505.

Subsequently, decision is made whether or not the time set at the pin unlocking time counter CP exceeds the time Tp (e.g. 1000 [msec]) required for the lock pin 15 to move or displace by the stroke quantity Ls against the biasing force exerted by the urging means 16, i.e., whether or not CP>Tp, in a step S506. The time Tp (FIG. 7) is represented by a constant experimentally determined in advance and stored in the memory of the ECU 1117.

When it is decided in the step S506 that the time set at the pin unlocking time counter CP is equal to or exceeds the time Tp (i.e., when the decision step S506 results in "YES"), then it is determined that the lock pin 15 has completely been released from the locked state, whereupon the processing routine illustrated in FIG. 5 comes to an end (Return), and transition is made to the ordinary phase feedback control.

On the other hand, in the case where time of the pin unlocking time counter CP is short of the time Tp (i.e., when the decision step S506 results in "NO"), the step S502 is resumed for continuing the lock pin releasing operation.

By carrying out the control operation described above, the detected phase angle $\theta a$ can approach to the desired phase angle $\theta t$ without fail, as illustrated in FIG. 6, to allow the phase feedback control to be effectuated properly with the oil control valve current value Iout converging on the hold current value Ic as shown in FIG. 7.

As is apparent from the foregoing, according to the teachings of the present invention incarnated in the first embodiment thereof, when the desired phase angle $\theta t$ changes from the angular position at which the lock pin 15 is retained in the locked state, then the oil control valve current value Ib at which a hydraulic pressure lower than the rotor actuating hydraulic pressure P3 (FIG. 2) is generated is computed on the basis of the hold current value Ic to be supplied to the oil control valve for the predetermined time Tp (FIG. 7) before the phase feedback control based on the desired phase angle $\theta t$ and the detected phase angle $\theta a$ is put into effect, whereby the lock pin 15 can completely be released from the locked state before the rotor 6 starts to rotate.

Thus, the valve timing can properly and smoothly be controlled for the desired phase angle $\theta t$ without being accompanied with tangling of the lock pin 15 and hence the drivability, fuel cost performance and the exhaust gas quality can satisfactorily be protected against degradation.

Embodiment 2

In the valve timing control apparatus according to the first embodiment of the invention, the oil control valve current value Iout is arithmetically determined on the basis of the hold current value Ic which is solely defined by one parameter. In the valve timing control apparatus according to a second embodiment of the invention, the hold current value Ic which can be represented by a sum of two learned values which differ from each other in respect to the updating period is employed.

Incidentally, the mechanical structure of the valve timing control apparatus according to the second embodiment of the invention is essentially same as that of the conventional apparatus described hereinbefore in conjunction with FIGS. 18 to 23. The valve timing control apparatus now under consideration differs from the conventional one only in several operations performed by the ECU 1117. Accordingly, the following description will primarily be directed to the operations or processings which differ from those of the conventional apparatus. With regard to the other respects, repeated description will be omitted.

The hold current value Ic will change every moment due to manufacturing dispersion among the constituent parts of the valve timing control apparatus and in dependence on the operating state of the internal combustion engine 1101. By way of example, the oil passage extending from the oil control valve 1114 to the cam phase actuator 1113 is not fluid-tightly sealed in general but implemented in a piping structure which involves more or less oil leakage as described previously.

The magnitude or amount of the oil leakage depends on the manufacturing dispersion of fine clearances occurring between joined surfaces of the oil supply pipes. Furthermore, in the case where the lubricating oil of the engine 1101 is made use of as the oil supplied to the cam phase actuator 1113, viscosity of the oil undergoes change as the oil temperature changes in dependence on the operating state of the engine 1101.

For the reasons mentioned above, discharge pressure of the oil pump 1118 (see FIG. 18) is caused to change. Besides, the amount of leakage through the fine or minute clearances between the joined surfaces of the pipes also changes. Since the hold current value Ic represents the oil control valve current value demanded for holding the rotor 6 at a desired or given angular position while compensating for the cam reaction force and the oil leakage, as pointed out hereinbefore, the hold current value Ic is caused to change when the amount of oil leakage changes.

By way of example, when a relatively large amount of oil leakage is occurring in the oil passage extending from the oil control valve 1114 (see FIG. 18) to the cam phase actuator 1113 (FIG. 18), it then becomes necessary to increase the hydraulic pressure supplied to the valve timing advancing hydraulic chamber 9 by increasing the oil control valve current in order to hold the second rotor 6 at the desired or given angular position against the cam reaction force or effort acting constantly in the valve timing retarding direction.

Figure 8:
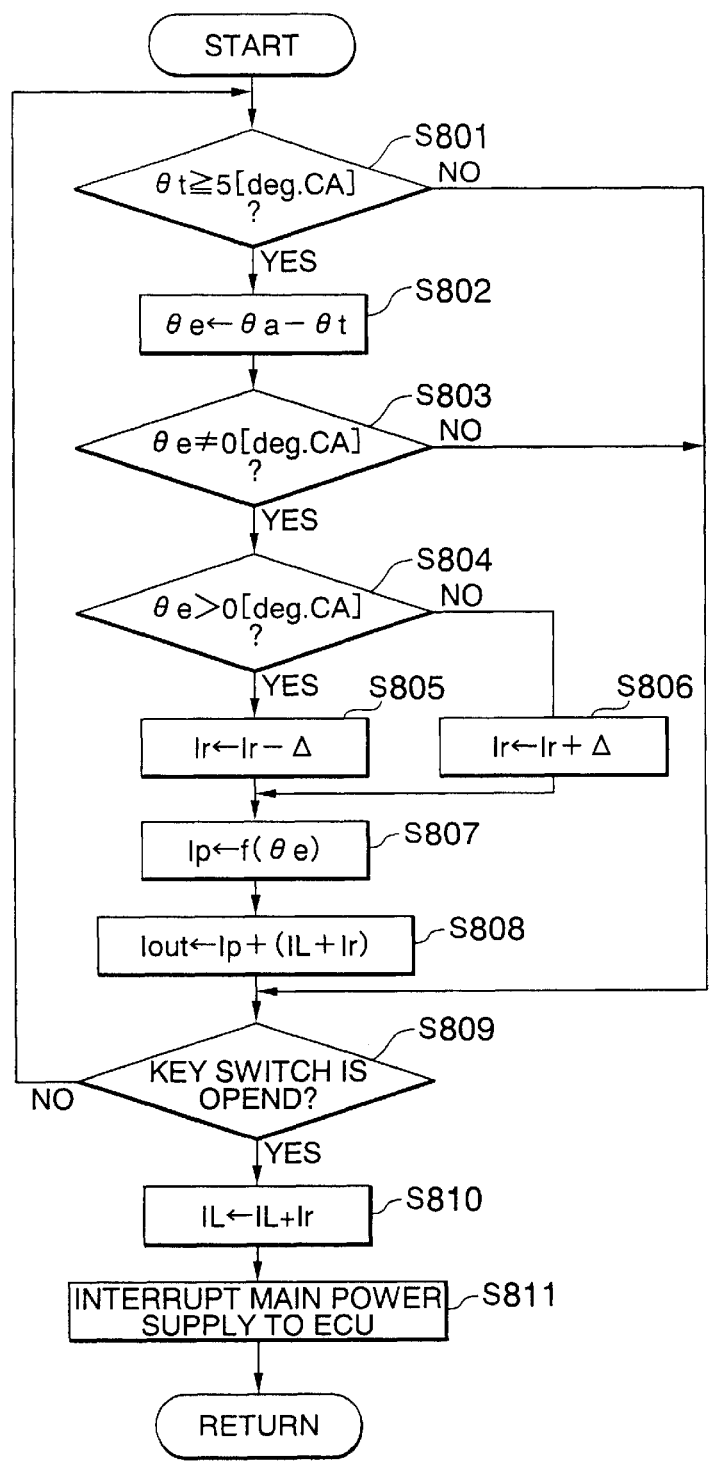
FIG. 8 is a flow chart for illustrating a processing procedure executed in the valve timing control apparatus according to a second embodiment of the present invention.

Now, description will be directed to the operation of the valve timing control apparatus according to the second embodiment of the present invention. FIG. 8 is a flow chart for illustrating, by way of example only, a processing procedure for updating the learned value which plays a role in determining the hold current value Ic. Needless to say, this processing is also executed by the ECU 1117 in the course of the phase feedback control.

In FIG. 8, "IL" represents a learned value which is used for correcting the change or variation of the hold current value Ic primarily ascribable to the manufacturing dispersion of constituent parts of the valve timing control apparatus and whose updating period is relatively long. This learned value will hereinafter be referred to also as the long-time learned value only for the convenience of description.

Further, in FIG. 8, "Ir" represents a learned value which is used for correcting the change or variation of the hold current value Ic ascribable to the change of the operating state of the engine 1101 and whose updating period is relatively short. This learned value will hereinafter be referred to also as the real-time learned value only for the convenience of description.

The hold current value Ic is represented by the sum of the two learned values which differ from each other in the updating period as mentioned above. Namely, $$Ic = IL + Ir \quad (2)$$

Now referring to FIG. 8, decision is made in a step S801 whether or not the desired phase angle $\theta t$ is equal to or greater than a predetermined value (e.g. 5 [deg. CA]).

When it is determined in the step S801 that the desired phase angle $\theta t$ is greater than the predetermined value inclusive (i.e., when the decision step S801 results in affirmation "YES"), difference or error θe between the desired phase angle θt and the detected phase angle θa is arithmetically determined in a step S802. On the other hand, when the desired phase angle θt is smaller than the predetermined value (i.e., when the decision step S801 results in negation "NO"), then the processing proceeds to a step S809 by skipping the step S802 to S803.

In succession, decision is made in a step S803 as to whether or not the error θe is equal to "0 (zero)". Unless the error θe is zero (i.e., when the decision step S803 results in "YES"), then the direction in which the error θe makes appearance (i.e., valve timing advancing direction or valve timing retarding direction) is determined by checking whether or not the error θe is greater than "0 (zero)" in a step S804.

When the error θe is determined to be "0" in the step S803 (i.e., when this step results in "NO"), this means that no error makes appearance, i.e., the desired phase angle θt and the detected phase angle θa coincide with each other. In that case, steps S804 to S808 for updating the real-time learned value Ir is not executed, but the processing proceeds to the step S809.

On the other hand, when it is decided in the step S804 that the error θe is greater than "0", i.e., the detected phase angle θa is greater than the desired phase angle θt (i.e., when the decision step S804 results in "YES"), then it is determined that the valve timing advances excessively beyond the desired valve timing and hence the hold current value Ic is learned to be greater than the real hold current value. Accordingly, in a succeeding step S805, the real-time learned value Ir is decreased by a predetermined value Δ. Incidentally, this predetermined value Δ is represented by a constant experimentally or empirically determined in advance.

On the other hand, when it is decided in the step S804 that the error θe is not grater than "0" (i.e., when the decision step S804 results in "NO"), it can then be determined that the learned value of the hold current value Ic is smaller than the real value. Accordingly, the real-time learned value Ir is increased by the predetermined value Δ in a step S806.

In succession, in a step S807, a current value Ip corresponding to the error θe is arithmetically determined in accordance with the undermentioned expression.

$$Ip=f(\theta e)=K \times \theta e \tag{3}$$

In the above expression (3), "f(θe)" represents a function for computing the value Ip for the purpose of adjusting the oil control valve current Iout in proportional dependence on the magnitude of the error θe, and K represents a constant indicating a value for transforming the error θe into the current value.

Subsequently, in a step S808, the current value Iout to be supplied to the oil control valve 1114 is arithmetically determined in accordance with the undermentioned expression (4) to thereby supply the current corresponding to the computed current value to the oil control valve 1114.

$$Iout=Ip+(IL+Ir) \tag{4}$$

In succession, decision is made as to whether or not a key switch is turned off (step S809). When the key switch is turned off (i.e., when the decision step S809 results in "YES"), then operation of the engine 1101 is stopped, whereon the long-time learned value IL is updated in a step S810. On the other hand, unless the key switch is turned off, (i.e., when the decision step S809 results in "NO"), then the step S801 is resumed for making decision as to necessity of updating the real-time learned value Ir.

At this juncture, it should be added that by updating the real-time learned value Ir in accordance with the undermentioned expression (5) in the step S810, the real-time learned value Ir is reflected in the long-time learned value IL in the succeeding operation of the engine.

$$IL=IL+Ir \tag{5}$$

In succession, the main power supply to the ECU 1117 is turned off to terminate the processing routine illustrated in FIG. 8 (step S811).

The long-time learned value IL is stored in a backup memory (not shown) which is so designed as to continuously hold the stored contents regardless of interruption of the main power supply for the ECU 1117. On the other hand, the real-time learned value Ir is stored in an ordinary memory (not shown either) whose contents are erased upon breakage of the main power supply. Thus, for the succeeding operation of the engine, the value updated in the step S810 in the preceding engine operation has been stored in the backup memory at a location allocated to the long-time learned value IL while "0" is stored in the ordinary memory at a location allocated to the real-time learned value Ir.

In general, the manufacturing dispersion of the constituent parts of the valve timing control apparatus exerts greater influence to the hold current value Ic than the change of the operating state of the engine 1101. Thus, by storing the long-time learned value IL when the key switch is opened as mentioned above, it is possible to make available a proper hold current value Ic immediately after the succeeding operation of the engine has been started.

In the valve timing control apparatus according to the instant embodiment of the invention, the hold current value Ic is updated by updating the real-time learned value Ir in dependence on the change of the operating state of the engine 1101 at a shorter periodical interval. Accordingly, it is possible to obtain the hold current value Ic accurately for every operating state of the engine.

Further, since the real-time learned value Ir is reflected in the long-time learned value IL in preparation for the succeeding engine operation, change of the oil leakage as a function of time lapse due to abrasion or wearing of the joined surfaces of the pipes can be taken into account in the valve timing control.

Although it has been mentioned in conjunction with the second embodiment of the invention that the long-time learned value IL is updated upon opening of the key switch, it should be understood that the long-time learned value IL may be updated in the course of operation of the engine 1101 as well provided that the updating period is sufficiently longer than the real-time learned value Ir.

As is apparent from the foregoing, by determining the hold current value Ic on the basis of the two learned values whose updating periods differ from each other, the hold current value Ic can be computed speedily with high accurately by taking into consideration the manufacturing dispersion in the valve timing control apparatus and the change in the engine operation state, which in turn means that the oil control valve current value Ib corresponding to the unlocking hydraulic pressure determined on the basis of the hold current value can equally be computed with high accuracy. Thus, the lock pin 15 can be released more positively with enhanced reliability.

Thus, the valve timing can properly be controlled for the desired phase angle θt without being accompanied with the tangling of the lock pin 15, and hence degradation of drivability, fuel cost performance and exhaust gas quality can positively be suppressed.

Embodiment 3

In the valve timing control apparatus according to the second embodiment of the invention, the oil control valve current value corresponding to the unlocking hydraulic pressure is arithmetically determined on the basis of the hold current value Ic and the constant Iu as parameters. A third embodiment of the present invention is directed to the valve timing control apparatus in which the oil control valve current Iout is set to an initial value incapable of releasing the locked state and changed at a predetermined rate in the direction for releasing the locked state.

Incidentally, the mechanical structure of the valve timing control apparatus according to the third embodiment of the invention is essentially same as that of the conventional apparatus described hereinbefore in conjunction with FIGS. 18 to 23. The valve timing control apparatus now under consideration differs from the conventional one only in several operations performed by the ECU 1117. Accordingly, the following description will primarily be directed to the operations or processings which differ from those of the conventional apparatus. With regard to the other respects, repeated description is omitted.

Next, the valve timing control apparatus according to the third embodiment of the present invention will be described by reference to FIGS. 9 to 12.

Figure 9:
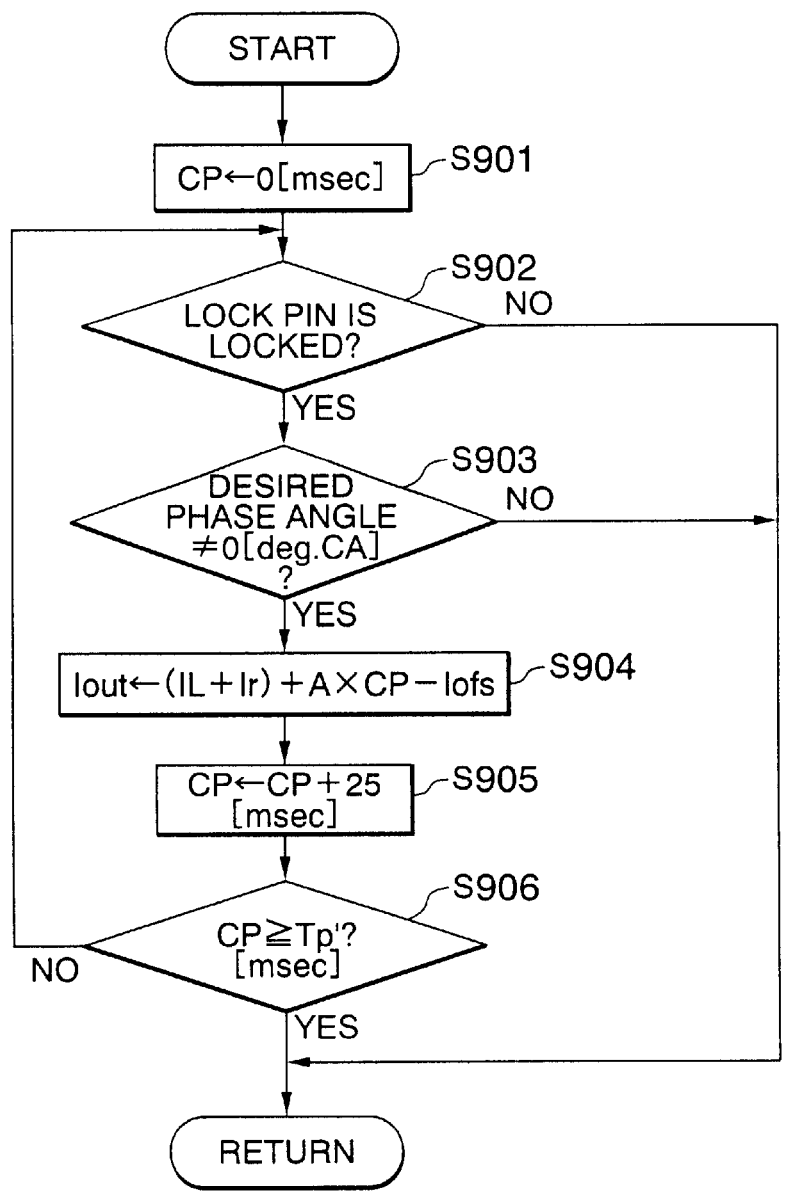
FIG. 9 is a flow chart for illustrating a processing procedure in the valve timing control apparatus according to a third embodiment of the present invention.
Figure 10:
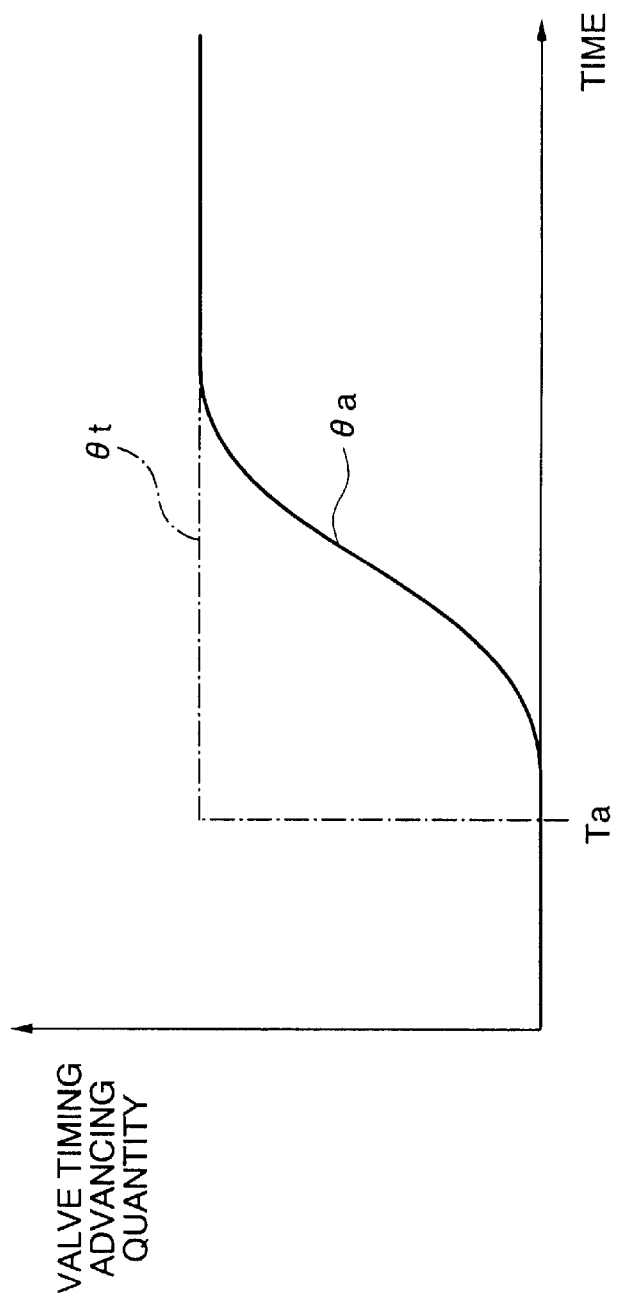
FIG. 10 is a timing chart showing a relation between a desired or target phase angle and a detected phase angle.
Figure 11:
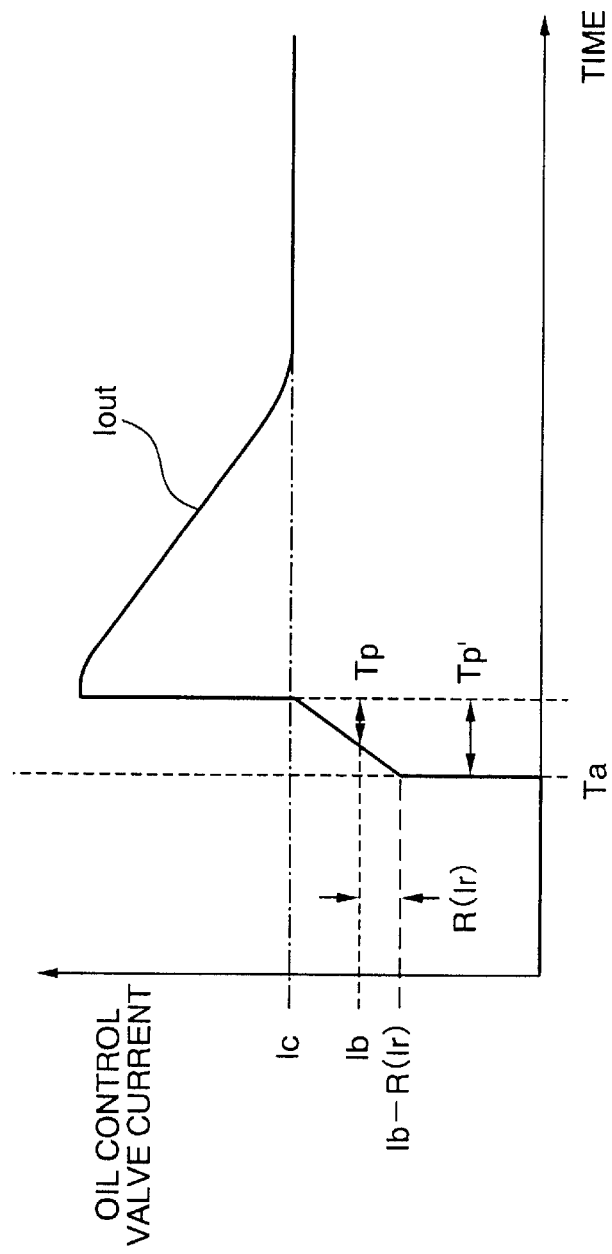
FIG. 11 is a timing chart showing an oil control valve current value.

FIG. 9 is a flow chart for illustrating a control procedure of the oil control valve current value Iout executed by the ECU 1117 for unlocking or releasing the lock pin from the locked state, and FIGS. 10 and 11 are timing charts showing the oil control valve current value Iout upon unlocking.

Figure 12:
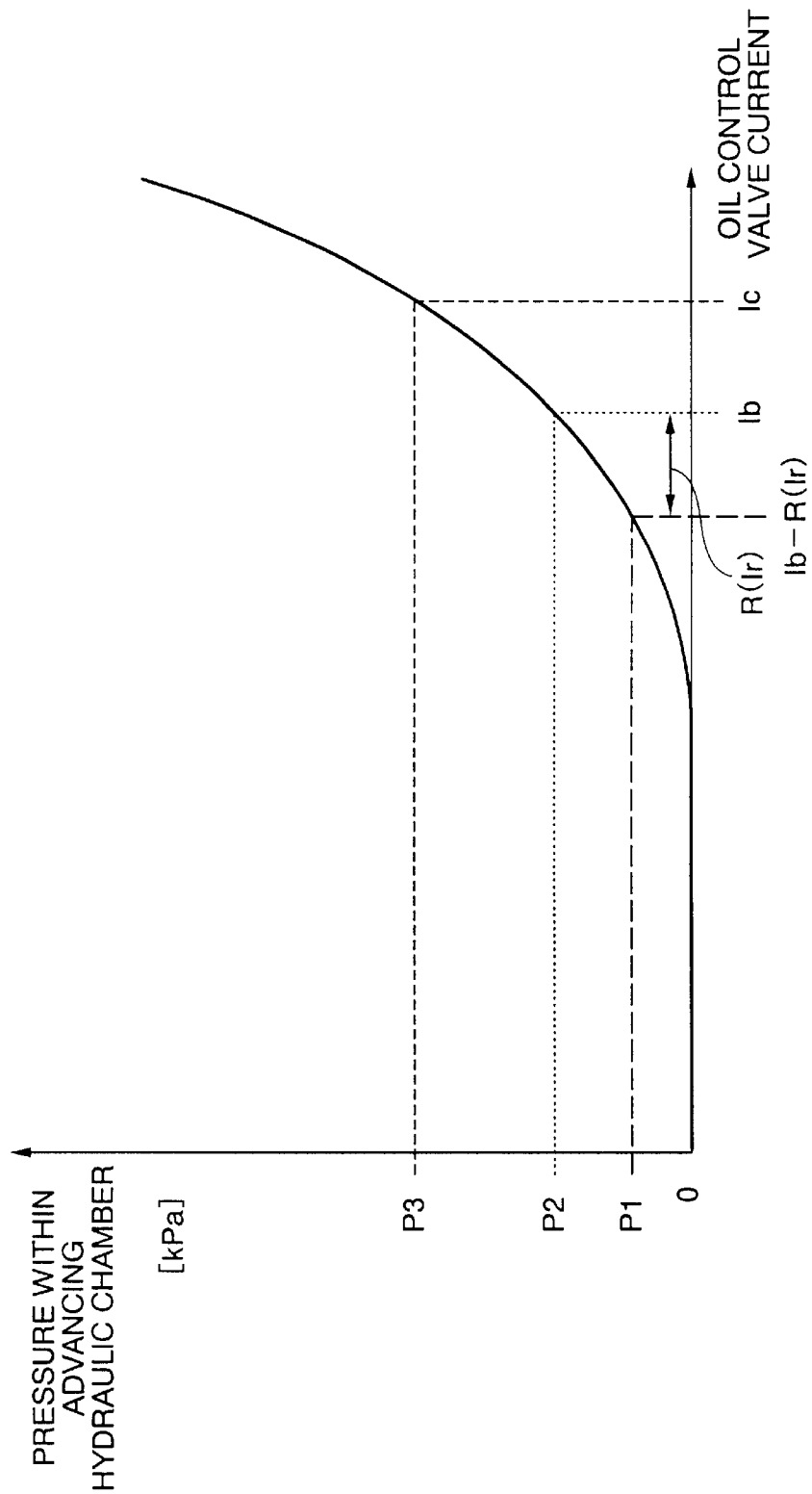
FIG. 12 is a view showing a relation between an initial value of the oil control valve current and a hydraulic pressure prevailing downstream of the oil control valve.

Further, FIG. 12 is a view showing a relation between an initial value of the oil control valve current Iout and the hydraulic pressure prevailing on the downstream side of the oil control valve upon unlocking.

The hold current value Ic changes in dependence on the change in the operating state of the internal combustion engine 1101 as described previously. Accordingly, even with the method described previously in conjunction with the second embodiment of the invention, a minute error may make appearance between the hold current value stored in the ECU 1117 and the real hold current value at a time point at which the lock pin 15 is unlocked.

By way of example, in the step S801 shown in FIG. 8, the opportunity capable of updating the real-time learned value Ir is limited by the condition that the desired phase angle θt be equal to or greater than 5 [deg. CA]. Consequently, in the case where the idling state (in which the desired or target phase angle θt is "0 (zero)" [deg. CA]) has continued for a long time in succession to the updating of the real-time learned value Ir at a low oil temperature and thereafter the oil temperature has increased, the real-time learned value Ir remains to be updated, and an error may unwantedly make appearance between the real-time learned value Ir stored in the ECU 1117 and the corresponding real value due to change of the oil temperature mentioned above and hence change of the oil leakage brought about by the oil temperature change.

As is described hereinbefore (see FIG. 2), the oil control valve current Iout to be supplied for releasing the lock pin 15 should intrinsically be equal to or greater than the current value Ib at which the hydraulic pressure P2 capable of releasing completely the lock pin 15 is generated and equal to or smaller than the hold current value Ic. However, in practice, the current value Ib and the hold current value Ic will vary due to the error mentioned previously. In that case, the lock pin 15 will remain unlocked notwithstanding of the supply of the oil control valve current Iout to the oil control valve 1114, giving rise to a problem.

For coping with the problem mentioned above, it is proposed according to the teaching of the present invention incarnated in the instant embodiment that the current supplied to the oil control valve 1114 for unlocking the lock pin 15 is set to an initial value in the direction in which the lock pin 15 can not be released from the locked state (valve timing retarding direction) with reference to the current value Ib corresponding to the pin unlocking hydraulic pressure P2 (see FIGS. 11 and 12).

Further, during a predetermined period starting from the time point at which the initial value of the supply current is set, the oil control valve current Iout being supplied to the oil control valve 1114 is increased at a predetermined rate in the direction for releasing the lock pin (i.e., in the valve timing advancing direction). See FIG. 11.

Next, description will be directed to a control operation of releasing the lock pin executed by the ECU 1117 in the valve timing control apparatus according to the instant embodiment of the invention.

Incidentally, steps S901 to S903, S905 and S906 shown in FIG. 9 correspond to the steps S501 to S503, S505 and S506 described hereinbefore by reference to FIG. 5. Accordingly, repeated description of these steps will be unnecessary.

Referring to FIG. 9, the pin unlocking time counter CP is set to "0 (zero)" in a step S901 and then decision is made in a step S902 whether or not the lock pin 15 is in a retained state.

When it is determined in the step S902 that the lock pin 15 is in the retained state, it is then checked in a step S903 that the desired or target phase angle θt does not represent the most retard position. On the other hand, when it is determined in the step S902 that the lock pin 15 is not in the retained state, the lock pin release processing routine shown in FIG. 9 is terminated (Return) and transition is made to the ordinary phase feedback control.

When it is determined in the step S903 that the desired or target phase angle θt does not represent the most retard position (0(zero) [deg. CA]), i.e., when the decision step S903 results in "YES"), then the oil control valve current value Iout is set in accordance with the following expression (6) (step S904):

$$Iout = (IL + Ir) + A \times CP - Iofs \tag{6}$$

where A represents an increasing rate (ratio) of the oil control valve current (e.g. 0.1 [mA/msec]) and Iofs represents a value for setting the initial value of the oil control valve current Iout in the valve timing retarding direction (e.g. 200 [mA]).

When it is determined in the step S903 that the desired phase angle θt represents the most retard position (zero [deg. CA]), i.e., when the decision step S903 results in "NO", the lock pin release processing routine shown in FIG. 9 is terminated (Return) and transition is made to the ordinary phase feedback control.

Subsequently, the pin unlocking time counter CP is incremented by the time corresponding to one processing period (e.g. 25 [msec]) in a step S905, whereon decision is made as to whether or not the time set at the pin unlocking time counter CP exceeds a time Tp' (e.g. 1500 [msec]), i.e., whether or not CP>Tp', in a step S906.

When it is decided in the step S906 that the time set at the pin unlocking time counter CP is equal to or exceeds the time Tp' (i.e., when the decision step S906 results in "YES"), then it is determined that the lock pin 15 has been released from the locked state, whereupon the processing routine shown in FIG. 9 comes to an end (Return), and transition is then made to the ordinary phase feedback control.

On the other hand, when it is determined that the time set at the pin unlocking time counter CP does not exceed the time Tp' (i.e., when the decision step S906 results in "NO"), the step S902 is resumed to continue the lock pin releasing operation.

The increasing rate A of the oil control valve current is set to a value at which there can be assured the time Tp required for the lock pin 15 to move or displace by the stroke Ls against the biasing force exerted by the urging means 16 during the period in which the oil control valve current value Iout changes from the pin unlocking current value Ib to the hold current value Ic. See FIG. 11.

Further, the predetermined value Ioft is set to the sum of a current range (Ic–Ib) in which the lock pin 15 can be released and a range R(Ir) within which the real-time learned value Ir changes in dependence on the change of the operating state of the engine 1101, i.e., the value determined arithmetically in accordance with the following expression (7):

$$Iofs=(Ic-Ib)+R(Ir) \qquad (7)$$

Incidentally, in the expression (7), both the values (Ic–Ib) and R(Ir) are constants experimentally determined in advance (see FIGS. 11 and 12).

As is apparent from the foregoing, according to the invention incarnated in the third embodiment, it is taught that when the desired phase angle θt changes from the angular position at which the lock pin 15 is in the retained state, the initial value of the supply current Iout to the oil control valve 1114 is set to a value in the direction incapable of releasing the locked state with reference to the hold current value Ic and changed at a predetermined rate in the direction for releasing the locked state. By virtue of this arrangement, the lock pin 15 can positively be released.

Thus, the valve timing can properly be controlled for the desired phase angle θt without being accompanied with tangling of the lock pin 15 (see FIG. 10) and hence degradation of drivability, fuel cost performance and exhaust gas quality can be suppressed with enhanced reliability.

Embodiment 4

In the case of the valve timing control apparatus according to the third embodiment of the invention, a single constant value is employed as the increasing rate A. In the valve timing control apparatus according to a fourth embodiment of the present invention, the increasing rate which changes in dependence on the operating state of the internal combustion engine 1101 is employed.

Parenthetically, the mechanical structure of the valve timing control apparatus according to the fourth embodiment of the invention is essentially same as that of the conventional apparatus described hereinbefore in conjunction with FIGS. 18 to 23. The valve timing control apparatus now concerned differs from the conventional one only in several operations performed by the ECU 1117. Accordingly, the following description will primarily be directed to the operations or processings which differ from those of the conventional apparatus. With regard to the other respects, repeated description is omitted.

Now, referring to FIG. 13, the fourth embodiment of the present invention will be described.

Figure 13:
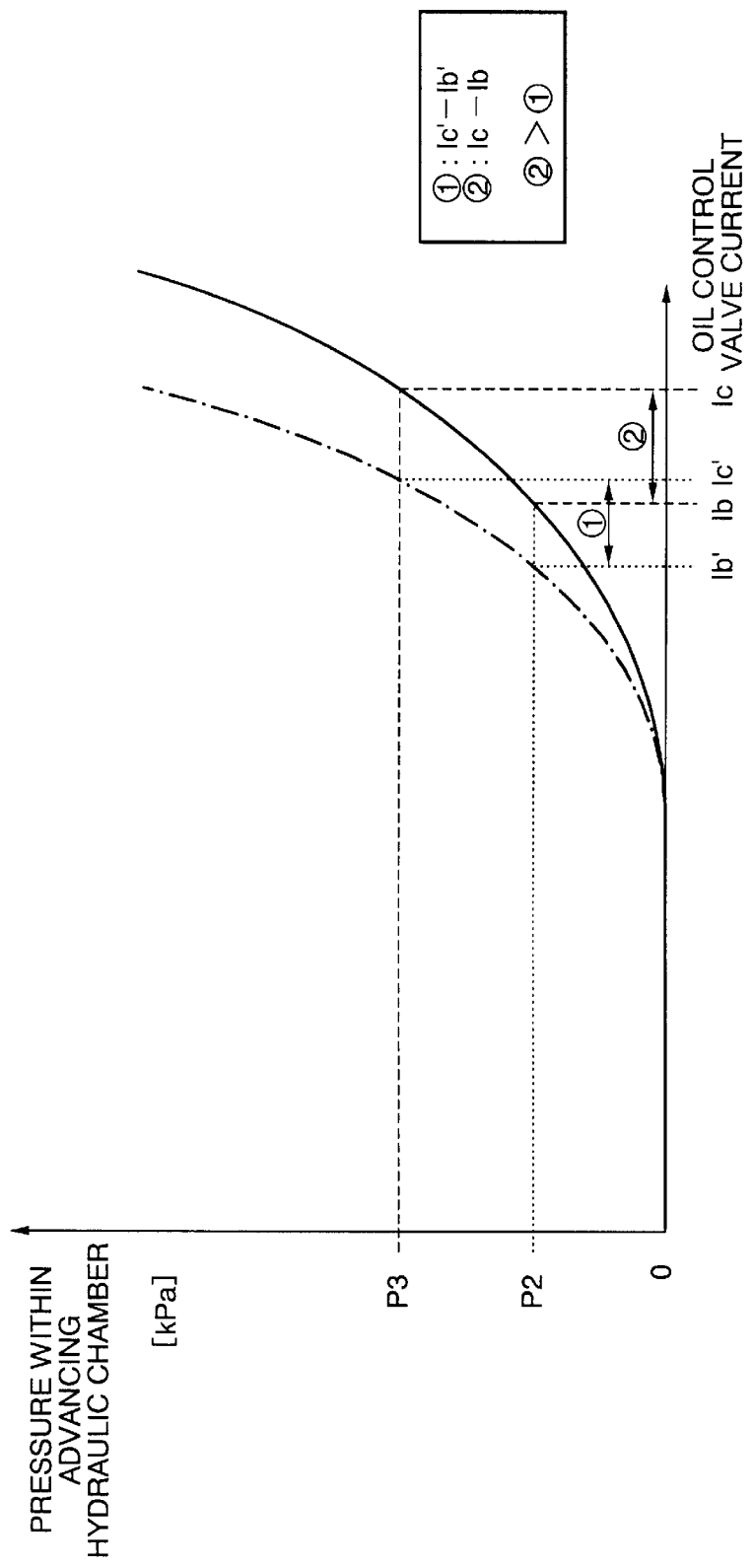
FIG. 13 is a characteristic diagram for graphically illustrating a relation between the oil control valve current value and the hydraulic pressure fed to a valve timing advancing hydraulic chamber.

FIG. 13 is a characteristic diagram for graphically illustrating relations between the oil control valve current value and the hydraulic pressure fed to the valve timing advancing hydraulic chamber 9 for different hydraulic pressures prevailing upstream of the oil control valve.

The opening degree of the hydraulic pressure for the oil control valve 1114 is definitely determined for the value of the supply current fed to the oil control valve 1114. Accordingly, for the same oil control valve current value, the hydraulic pressure fed to the cam phase actuator 1113 becomes high when the hydraulic pressure prevailing on the upstream side of the oil control valve is high.

To say in another way, the relation between the oil control valve current value and the hydraulic pressure prevailing on the downstream side of the oil control valve depends on the hydraulic pressure prevailing on the upstream side of the oil control valve.

It is further noted that in the valve timing control apparatus which includes an oil pump 1118 adapted to be driven through rotation of the crank shaft, the hydraulic pressure prevailing on the upstream side of the oil control valve depends on the rotation speed of the engine 1101. By way of example, when the rotation speed of the engine increases, the hydraulic pressure on the upstream side of the oil control valve also increases correspondingly. Besides, change of the temperature of the hydraulic medium or oil brings about a corresponding change in the viscosity of oil, which is reflected in the discharge efficiency of the oil pump 1118.

By way of example, when the oil temperature is relatively high, viscosity of the oil is low, as a result of which the hydraulic pressure prevailing upstream of the oil control valve is low.

Accordingly, the oil control valve current values Ib and Ic for feeding the pin unlocking hydraulic pressure P2 capable of completely unlocking the lock pin 15 and the rotor actuating hydraulic pressure P3 to the valve timing advancing hydraulic chamber 9 are subjected to the influence of the rotation speed of the engine 1101 and the oil temperature.

In the characteristic diagram shown in FIG. 13, the hydraulic pressure supplied or fed to the valve timing advancing hydraulic chamber 9 in a typical operating state of the engine is represented by a solid-line curve. Further, the oil control valve current values which correspond to hydraulic pressures P2 and P3, respectively, are represented by Ib and Ic, respectively.

On the other hand, in the case where the hydraulic pressure prevailing upstream of the oil control valve is high, the hydraulic pressure fed to the valve timing advancing hydraulic chamber 9 is represented by a single-dotted broken line curve in FIG. 13. Further, the oil control valve current values which correspond to hydraulic pressures P2 and P3 are represented by Ib' and Ic', respectively.

As can be seen in FIG. 13, the current range (Ic'–Ib') in which the lock pin 15 can be unlocked is narrower than the current range (Ic–Ib).

Accordingly, in the case where the hydraulic pressure prevailing on the upstream side of the oil control valve is high, there may arise such situation that the range of the oil control valve current value within which the lock pin 15 can be released from the locked state is swept within a too short time to ensure the time required for displacing the lock pin 15 over the stroke Ls, when the oil control valve current value is increased at a constant current increasing rate A.

Such being the circumstance, with a view to ensure the time required for displacing the lock pin 15 over the stroke Ls, it is proposed to decrease the current increasing rate A as the hydraulic pressure on the upstream side of the oil control valve becomes high.

Figure 14:
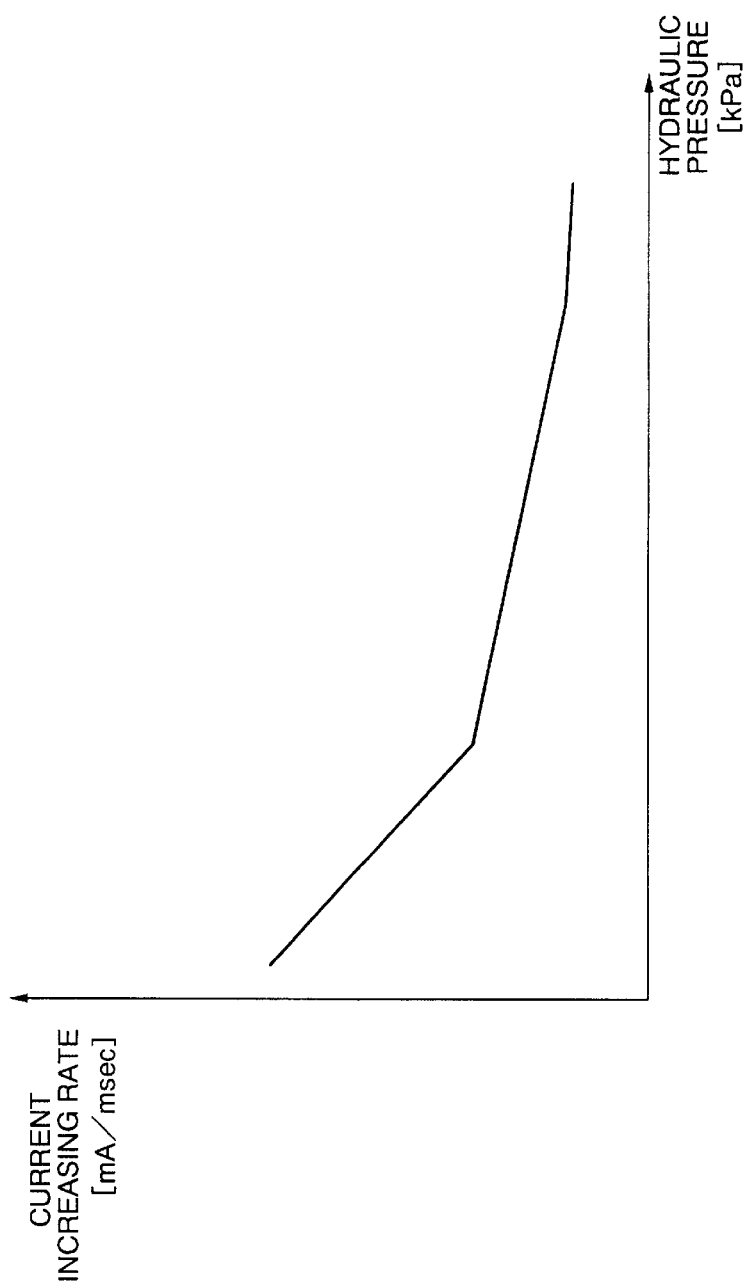
FIG. 14 is a view for illustrating how a current increasing rate is set as a function of a hydraulic pressure of an internal combustion engine.

FIG. 14 is a view for illustrating how the current increasing rate is set as a function of the hydraulic pressure of the engine 1101. As can be seen in the figure, the value of the current increasing rate A is so set as to decrease as the hydraulic pressure increases.

The pattern of the change of the current increasing rate A mentioned above is stored in a memory incorporated in the ECU 1117, and the hydraulic pressure prevailing on the upstream side of the oil control valve is detected by means of the hydraulic pressure sensor 1119, whereon the oil control valve current value Iout is arithmetically determined by using the corresponding current increasing rate A in the step S904 described hereinbefore in conjunction with FIG. 9.

Figure 15:
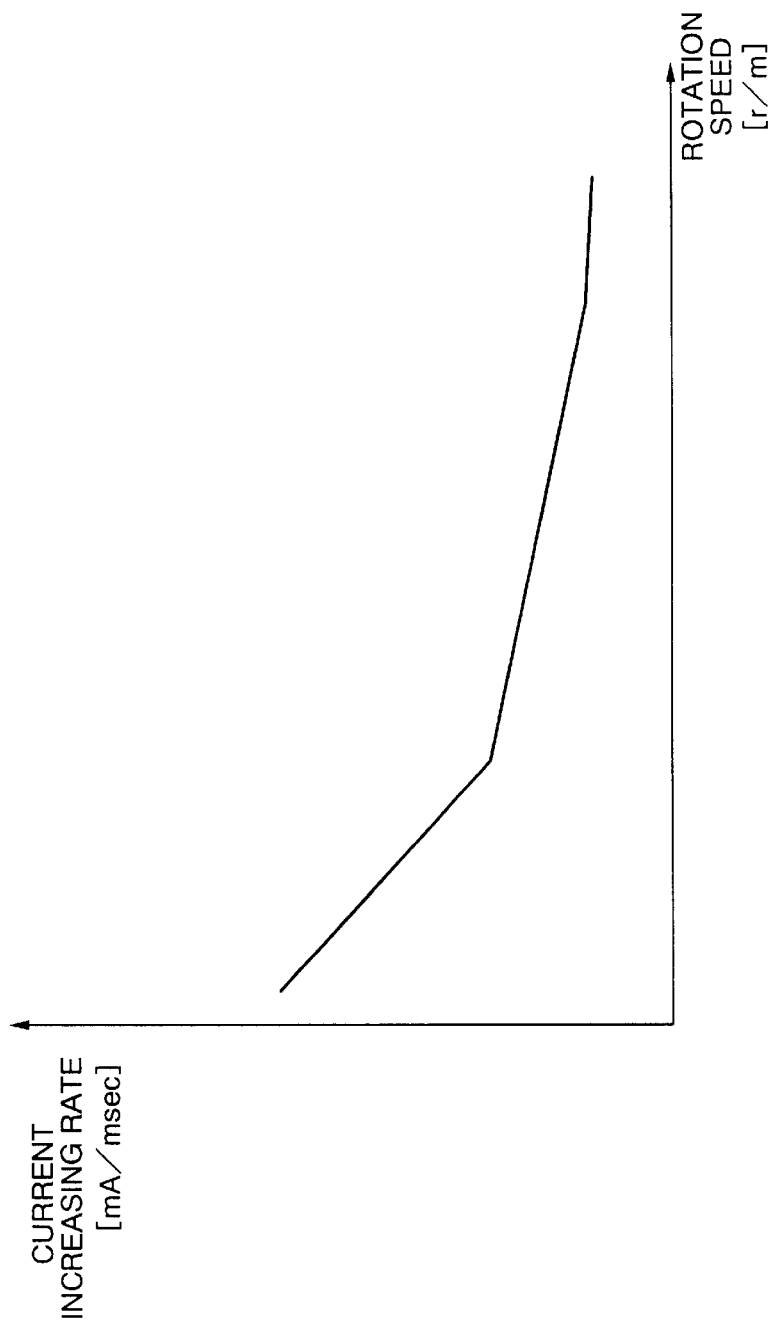
FIG. 15 is a view for illustrating how the current increasing rate is set as a function of a rotation speed of the engine.

FIG. 15 is a view for illustrating how the current increasing rate A is set as a function of the rotation speed of the engine 1101. As described previously, because the current increasing rate A has to be decreased when the hydraulic pressure increases, the current increasing rate A is so set as to decrease in the situation where the hydraulic pressure increases or the rotation speed of the engine 1101 increases, to say in another way.

The pattern of the change of the current increasing rate A shown in FIG. 15 is stored in a memory incorporated in the ECU 1117, and the oil control valve current value Iout is arithmetically determined by using the current increasing rate A corresponding to the rotation speed of the engine 1101 in the step S904 shown in FIG. 9 instead of detecting the hydraulic pressure prevailing on the upstream side of the oil control valve.

In this case, there arises no necessity of measuring the hydraulic pressure and the oil temperature. Accordingly, the hydraulic pressure sensor 1119 and the oil temperature sensor 1120 may be spared, which is profitable in view of simplification of the system configuration and low manufacturing cost.

Figure 16:
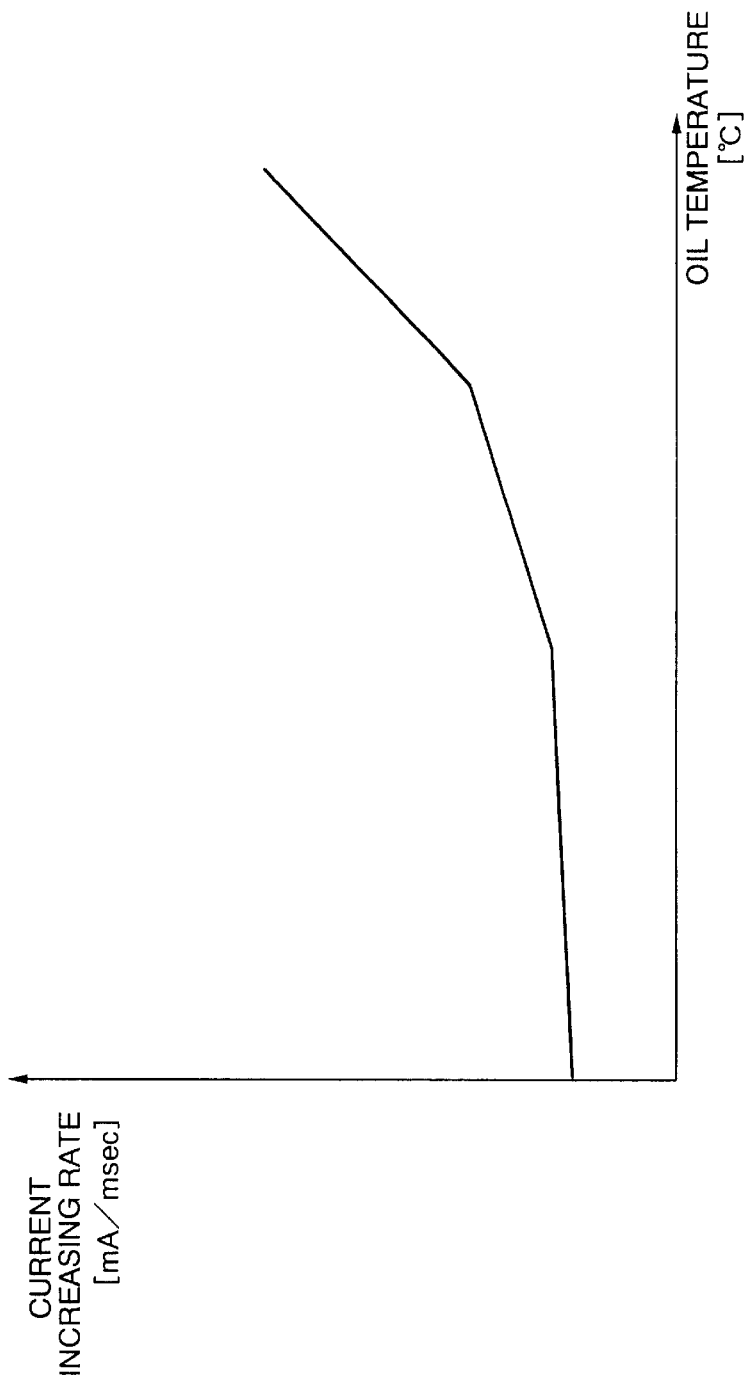
FIG. 16 is a view for illustrating how the current increasing rate is set as a function of an oil temperature of the engine.

FIG. 16 is a view for illustrating how the current increasing rate A is set as a function of the oil temperature of the engine 1101. As described previously, because the current increasing rate A has to be decreased when the hydraulic pressure is high, the current increasing rate A is so set as to decrease in the situation where the hydraulic pressure increases, i.e., the discharge efficiency of the oil pump 1118 becomes high with the oil temperature lowering.

The pattern of the change of the current increasing rate A mentioned above is stored in a memory incorporated in the ECU 1117, and the oil temperature prevailing on the upstream side of the oil control valve is detected by the oil temperature sensor 1120 instead of detecting the hydraulic pressure prevailing on the upstream side of the oil control valve, whereon the oil control valve current value Iout is arithmetically determined by using the current increasing rate A corresponding to the detected oil temperature in the step S904 shown in FIG. 9.

Thus, there is no necessity of measuring the hydraulic pressure. Accordingly, the hydraulic pressure sensor 1119 may be spared, which is profitable in view of simplification of the system configuration and low manufacturing cost.

Figure 17:
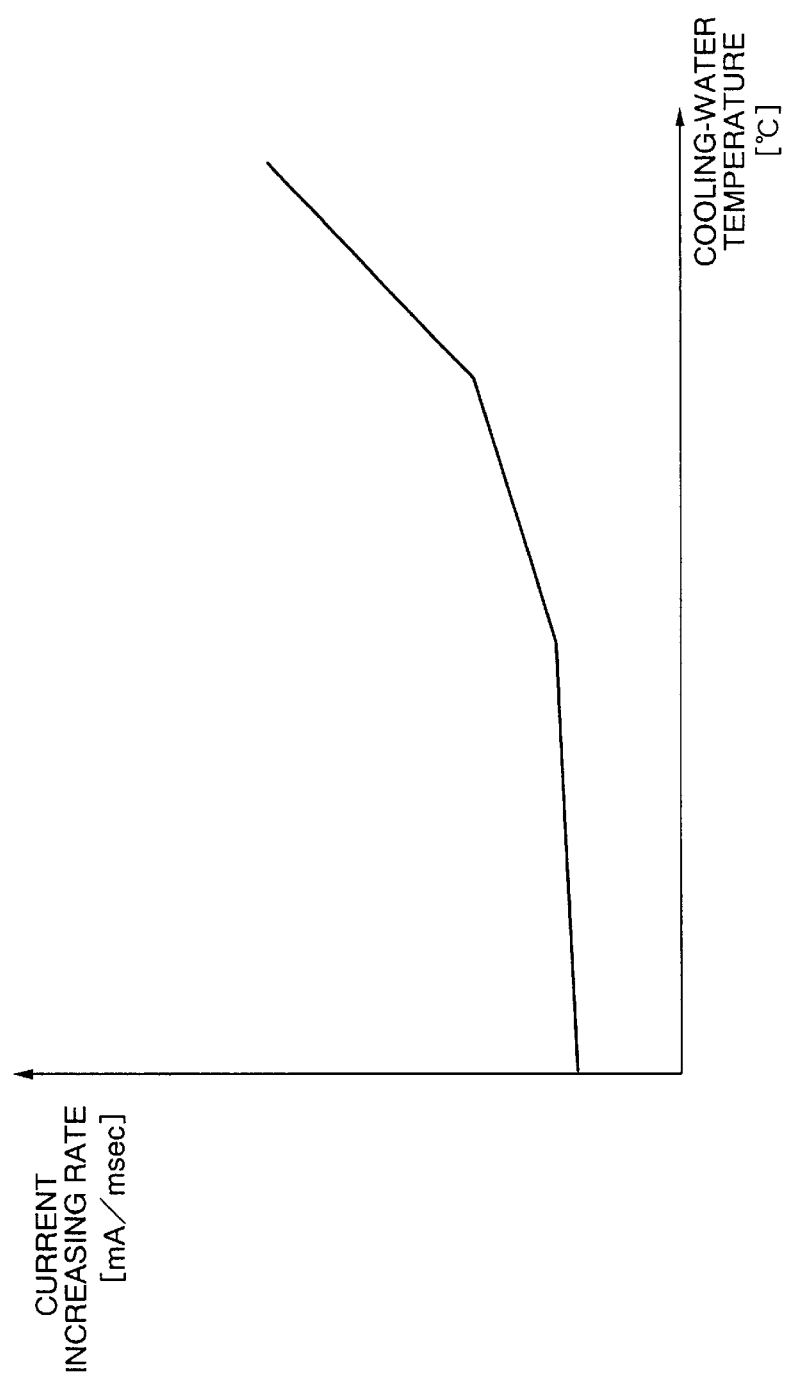
FIG. 17 is a view for illustrating how the current increasing rate is set as a function of a cooling water temperature of the engine.
Figure 18:
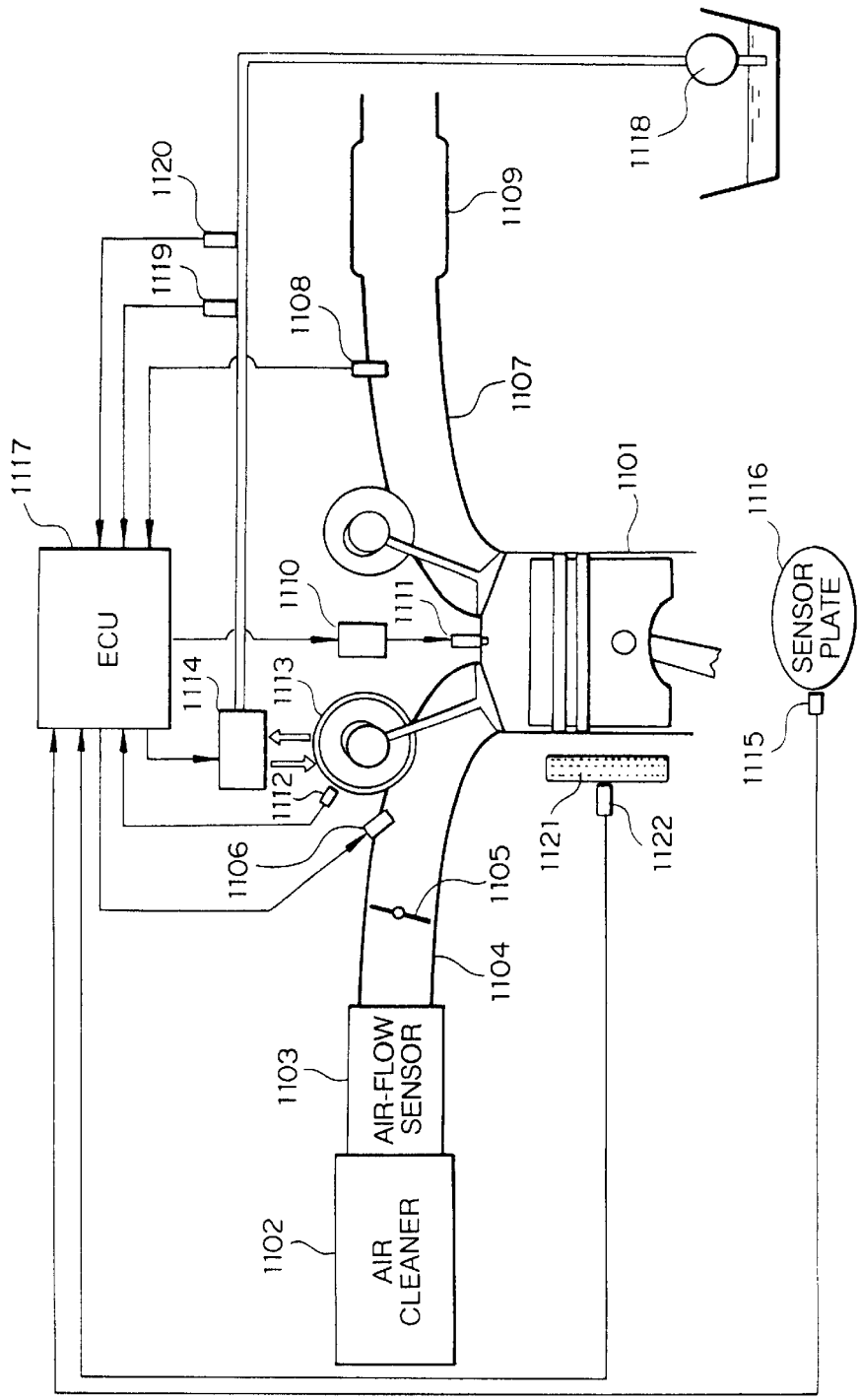
FIG. 18 is a view showing generally and schematically a structure of an internal combustion engine equipped with a conventional valve control apparatus to which the present invention can find application.
Figure 19:
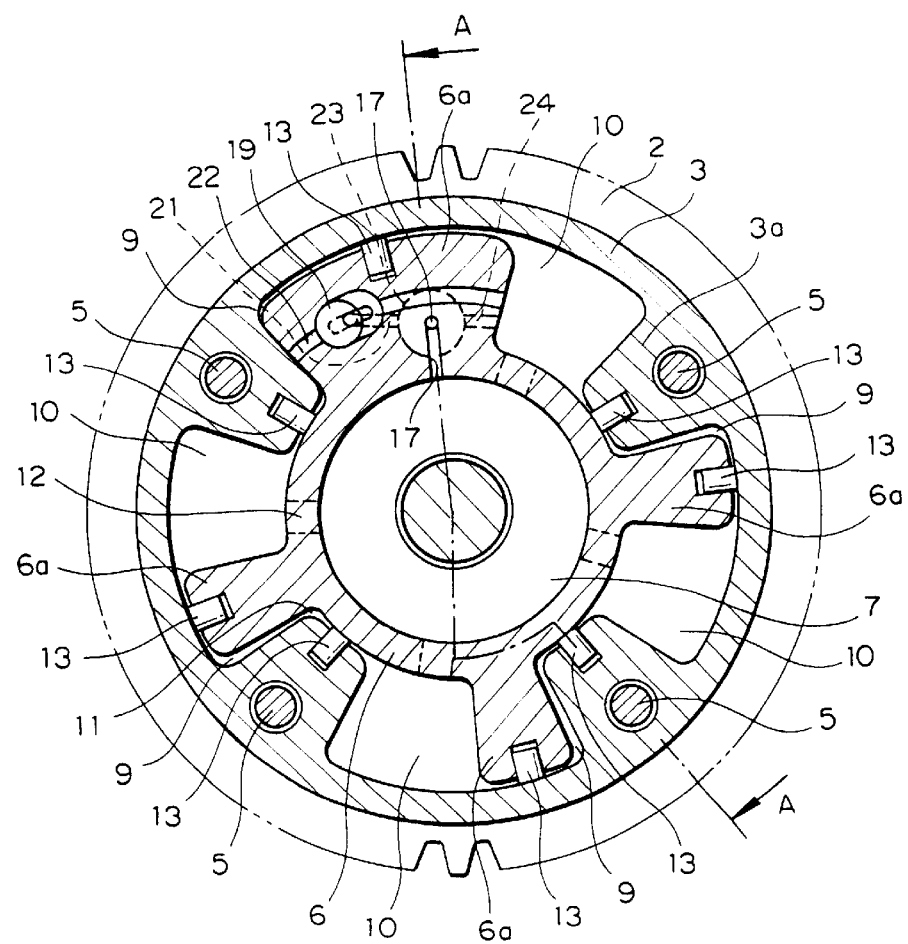
FIG. 19 is a cross sectional view showing an internal structure of a conventional vane-type valve timing control apparatus to which the present invention can be applied.
Figure 20:
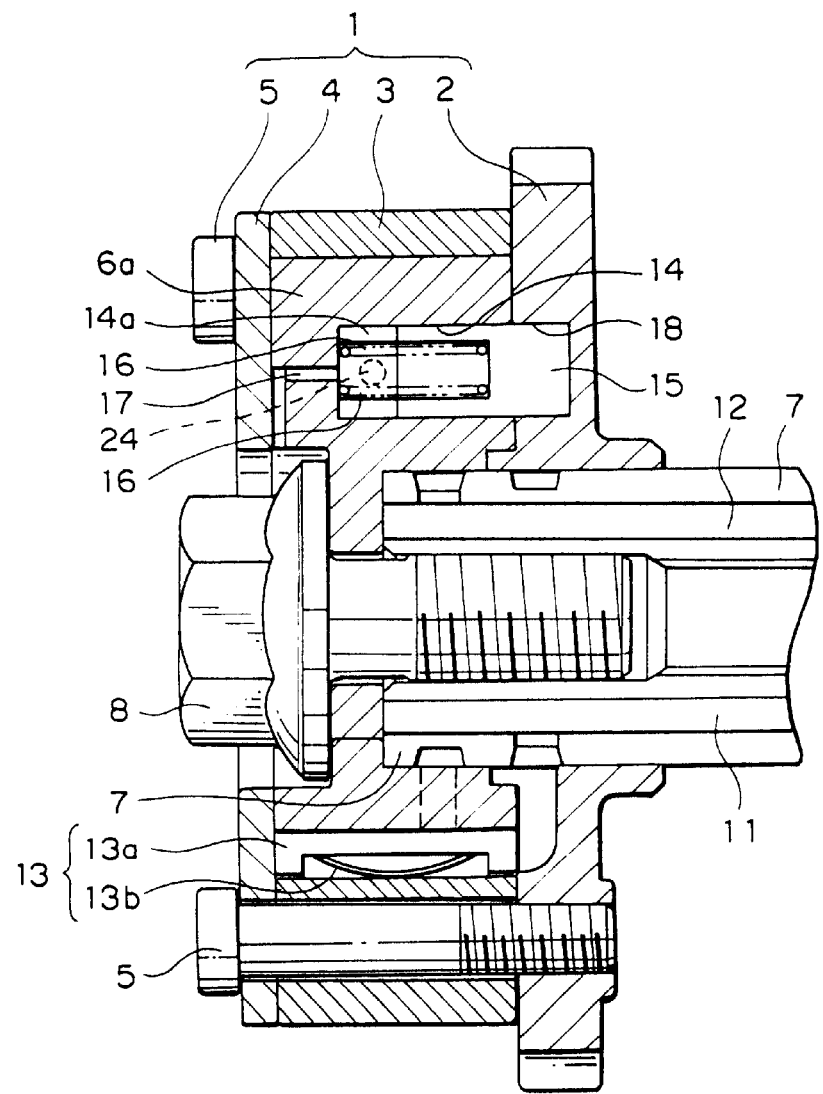
FIG. 20 is a vertical sectional view of the same taken along a line A—A shown in FIG. 19.
Figure 21:
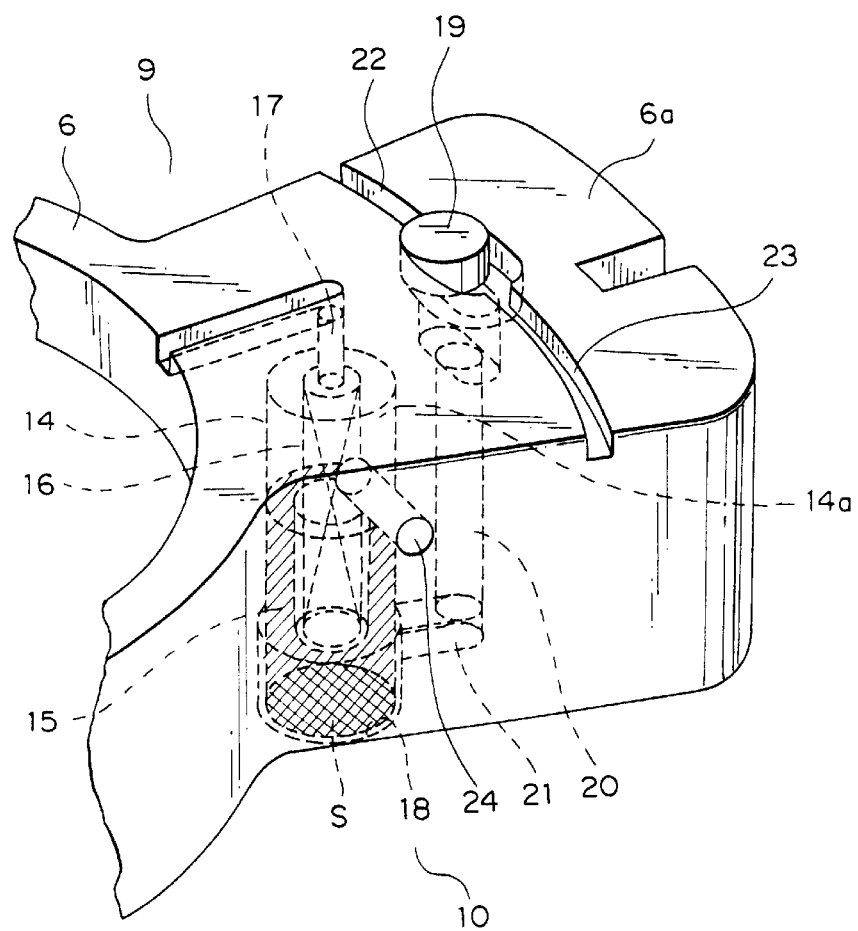
FIG. 21 is an enlarged perspective view showing a major portion of a lock/unlock mechanism of the conventional vane-type valve timing control apparatus to which the present invention can be applied.

FIG. 17 is a view for illustrating how the current increasing rate A is set as a function of the cooling water temperature of the engine 1101. As described previously, because the current increasing rate A has to be decreased when the hydraulic pressure is high, the current increasing rate A is so set as to decrease in the situation where the hydraulic pressure increases, i.e., the discharge efficiency of the oil pump 1118 is high with the coil temperature by estimating the oil temperature is low on the basis of the cooling water temperature. In other words, the current increasing rate A is so set as to be decreased as the cooling water temperature becomes low, to say in another way.

The pattern of the change of the current increasing rate A shown in FIG. 17 is stored in a memory incorporated in the ECU 1117, and the cooling water temperature of the engine 1101 is detected by means of the water temperature sensor 1122 instead of detecting the hydraulic pressure prevailing on the upstream side of the oil control valve, whereon the oil control valve current value Iout is arithmetically determined by using the current increasing rate A corresponding to the detected cooling water temperature in the step S904 shown in FIG. 9.

Thus, there arises no necessity of measuring the hydraulic pressure and the oil temperature. Accordingly, the hydraulic pressure sensor 1119 and the oil temperature sensor 1120 may be spared, which is profitable in view of simplification of the system configuration and low manufacturing cost.

At this juncture, it should be mentioned that although it has been presumed in the foregoing description that one of the parameters, i.e., the engine rotation speed, the oil temperature and the cooling water temperature is employed instead of detecting the hydraulic pressure on the upstream side of the oil control valve, these parameters, i.e., the rotation speed, the oil temperature and the cooling water temperature of the engine 1101 which bear high correlation to the hydraulic pressure on the upstream side of the oil control valve, respectively, may be employed in appropriate combination for the purpose of enhancing the accuracy of estimating the hydraulic pressure on the upstream side of the oil control valve.

As is apparent from the foregoing, according to the teachings of the present invention incarnated in the fourth embodiment thereof, when the desired phase angle θt changes from the angular position at which the lock pin 15 is retained, the initial value of the oil control valve current Iout is set to a value in the direction incapable of releasing the locked state with reference to the hold current value Ic while the current increasing rate is determined in dependence on the operating state of the engine 1101, to thereby change the oil control valve current value Iout in the direction for releasing or clearing the locked state. In this manner, the lock pin 15 can be released from the locked state with high reliability.

Thus, the valve timing can properly be controlled for the desired phase angle θt without tangling of the lock pin 15, and hence degradation of drivability, fuel cost performance and exhaust gas quality can be prevented.

Effects of the Invention

As is apparent from the foregoing, the present invention has provided the valve timing control apparatus for an internal combustion engine, which apparatus comprised of the cam phase actuator including the first rotor assembly capable of rotating in synchronism with the crank shaft of the engine, the second rotor fixedly mounted on the cam shaft for opening and closing the intake valve or the exhaust valve of the engine, and the lock mechanism for locking the second rotor to the first rotor at the first relative angle, the oil pump for generating the hydraulic pressure for the engine, the arithmetic means for arithmetically determining the current value corresponding to the hydraulic pressure for releasing the locked state at the first relative angle to thereby shift the first relative angle to the second relative angle, and the hydraulic pressure regulating means for supplying the hydraulic pressure for regulating the cam phase of the second rotor in dependence on the current value. In the valve timing control apparatus, the arithmetic means is so designed as to arithmetically determine the first current value for generating the first hydraulic pressure for releasing the locked state at the first relative angle. The first current value is supplied to the hydraulic pressure regulating means for the predetermined time before shifting the first relative angle.

By virtue of the arrangement of the valve timing control apparatus described above, the valve timing can properly be controlled for the desired phase angle without being accompanied with tangling of the lock pin because the locked state can be cleared or released before the rotor starts the rotation. Thus, degradation of drivability, fuel cost performance and exhaust gas quality of the engine can be suppressed with enhanced reliability to advantageous effect.

In the valve timing control apparatus described above, the arithmetic means can be so designed as to arithmetically determine the first current value on the basis of the hold current value for holding the cam phase actuator at the second relative angle.

With the arrangement of the valve timing control apparatus described above, the lock pin can be released from the locked state before the rotor starts to rotate.

In the valve timing control apparatus described above, the arithmetic means can be so designed as to update the hold current value on the basis of the first learned value and the second learned value in the course of operation of the internal combustion engine. In that case, the first learned value is updated on the basis of an error between a desired value of the second relative angle and a detected value therefor, while the second learned value having an updating period longer than that of the first learned value is updated on the basis of the first learned value.

With the arrangement of the valve timing control apparatus described above, the hold current value can be computed speedily and accurately by taking into account the manufacturing dispersions of the constituent parts and variation of the engine operation, and thus the lock pin can be released without fail with enhanced reliability. Further, the valve timing can properly be controlled for the desired phase angle while avoiding tangling of the lock pin. Thus, drivability, fuel cost performance and exhaust gas quality of the engine can positively be protected from degradation.

In the valve timing control apparatus described above, the arithmetic means can be so designed as to control the current supplied to the hydraulic pressure regulating means such that the current is increased at the predetermined rate from the initial current value corresponding to the hydraulic pressure value incapable of releasing the locked state rather than the first hydraulic pressure, to thereby release the locked state at the first relative angle.

With the arrangement of the valve timing control apparatus described above, the lock pin can be released more positively with enhanced reliability while the valve timing can properly be controlled for the desired phase angle with the lock pin being smoothly released. Thus, drivability, fuel cost performance and exhaust gas quality of the engine can be protected against degradation with high reliability.

In the valve timing control apparatus described above, the arithmetic means can be so designed as to set the predetermined rate on the basis of parameter(s) indicating operation state of the internal combustion engine.

With the arrangement of the valve timing control apparatus described above, the current increasing rate is determined by taking into account the operating state of the engine, whereby the lock pin can be released more positively with enhanced reliability. Further, the valve timing can properly be controlled for the desired phase angle without involving sticking of the lock pin. Thus, drivability, fuel cost performance and exhaust gas quality of the engine can significantly be improved.

In the valve timing control apparatus described above, the arithmetic means can be so designed as to set the predetermined rate on the basis of hydraulic pressure of the internal combustion engine.

With the arrangement of the apparatus described above, the current increasing rate is determined in dependence on the hydraulic pressure prevailing on the upstream side of the oil control valve. The lock pin can be unlocked without fail.

In the valve timing control apparatus described above, the arithmetic means can be so designed as to set the predetermined rate on the basis of rotation speed of the internal combustion engine.

With the arrangement described above, the hydraulic pressure sensor and the oil temperature sensor can be spared. Thus, simplification of the system configuration can be achieved.

In the valve timing control apparatus described above, the arithmetic means can be so designed as to set the predetermined rate on the basis of an oil temperature of the internal combustion engine.

With the arrangement described above, the hydraulic pressure sensor can be spared. Thus, the system configuration can be simplified.

In the valve timing control apparatus described above, the arithmetic means can be so designed as to set the predetermined rate on the basis of a cooling water temperature of the internal combustion engine.

With this arrangement, the hydraulic pressure sensor and the oil temperature sensor can be spared, whereby the system configuration can be much simplified.

Many modifications and variations of the present invention are possible in the light of the above techniques. It is therefore to be understood that within the scope of the appended claims, the invention may be practiced otherwise than as specifically described.

What is claimed is:

1. A valve timing control apparatus for an internal combustion engine, comprising:

a cam phase actuator including a first rotor capable of rotating in synchronism with a crank shaft of an internal combustion engine, a second rotor fixedly mounted on a cam shaft for opening and closing an intake valve or alternatively an exhaust valve of said internal combustion engine, and a lock mechanism for locking said second rotor to said first rotor at a first relative angle;

an oil pump for generating a hydraulic pressure for said internal combustion engine;

arithmetic means for arithmetically determining a current value corresponding to a hydraulic pressure for releasing a locked state at said first relative angle to thereby shift said first relative angle to a second relative angle; and hydraulic pressure regulating means for supplying a hydraulic pressure for regulating a cam phase of said second rotor in dependence on said current value, wherein oil pressure is supplied to only one of the advancing side or the retarding side of said actuator in order to release said lock mechanism, and wherein said arithmetic means is so designed as to arithmetically determine said first current value on the basis of a hold current value for holding said cam phase actuator at said second relative angle, said first current value is set to the value offset by a predetermined amount with said hold current as a reference in a direction incapable of releasing said lock mechanism.

2. A valve timing control apparatus for an internal combustion engine according to claim 1, wherein said arithmetic means is so designed as to update said hold current value on the basis of a first learned value and a second learned value in the course of operation of said internal combustion engine, said first learned value being updated on the basis of an error between a desired value of said second relative angle and a detected value therefor, said second learned value having an updating period longer than that of said first learned value and updated on the basis of said first learned value.

3. A valve timing control apparatus for an internal combustion engine according to claim 1, wherein said arithmetic means is so designed as to control the current supplied to said hydraulic pressure regulating means such that said current is increased at a predetermined rate from an initial current value corresponding to a hydraulic pressure value incapable of releasing said locked state rather than said first hydraulic pressure, to thereby release the locked state at the first relative angle.

4. A valve timing control apparatus for an internal combustion engine according to claim 3, wherein said arithmetic means is so designed as to set said predetermined rate on the basis of parameter(s) indicating operation state of said internal combustion engine.

5. A valve timing control apparatus for an internal combustion engine according to claim 4, wherein said arithmetic means is so designed as to set said predetermined rate on the basis of hydraulic pressure of said internal combustion engine.

6. A valve timing control apparatus for an internal combustion engine according to claim 4, wherein said arithmetic means is so designed as to set said predetermined rate on the basis of rotation speed of said internal combustion engine.

7. A valve timing control apparatus for an internal combustion engine according to claim 4, wherein said arithmetic means is so designed as to set said predetermined rate on the basis of an oil temperature of said internal combustion engine.

8. A valve timing control apparatus for an internal combustion engine according to claim 4, wherein said arithmetic means is so designed as to set said predetermined rate on the basis of a cooling water temperature of said internal combustion engine.

* * * * *